United States Patent
Kusano

(10) Patent No.: US 11,425,273 B2
(45) Date of Patent: Aug. 23, 2022

(54) INFORMATION PROCESSING APPARATUS FOR CONTROLLING ACCESS RIGHTS OF STORAGE AREAS VIA DIFFERENT NETWORK INTERFACES AND NON-TRANSITORY COMPUTER READABLE MEDIUM STORING PROGRAM

(71) Applicant: FUJIFILM Business Innovation Corp., Tokyo (JP)

(72) Inventor: Nobumi Kusano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/445,233

(22) Filed: Jun. 19, 2019

(65) Prior Publication Data

US 2020/0007703 A1    Jan. 2, 2020

(30) Foreign Application Priority Data

Jun. 28, 2018   (JP) .............................. JP2018-123251

(51) Int. Cl.
*H04N 1/60* (2006.01)
*H04N 1/00* (2006.01)
*H04N 1/32* (2006.01)

(52) U.S. Cl.
CPC ....... *H04N 1/00514* (2013.01); *H04N 1/0097* (2013.01); *H04N 1/00413* (2013.01); *H04N 1/00474* (2013.01); *H04N 1/32358* (2013.01); *H04N 1/32523* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,718,078 B2 | 5/2014 | Ooba | |
| 2011/0131310 A1* | 6/2011 | Ooba | G06F 3/1273 709/223 |
| 2013/0110995 A1* | 5/2013 | Kwon | H04N 1/32416 709/221 |
| 2019/0191041 A1* | 6/2019 | Ito | H04W 8/26 |
| 2019/0387127 A1* | 12/2019 | Kubota | H04N 1/00209 |

FOREIGN PATENT DOCUMENTS

| | | |
|---|---|---|
| JP | 2013138284 | 7/2013 |
| JP | 5511332 | 6/2014 |

* cited by examiner

*Primary Examiner* — Dung D Tran
(74) *Attorney, Agent, or Firm* — JCIPRNET

(57) ABSTRACT

An information processing apparatus includes plural network interfaces; a storage area for storing data, which is associated with output path information defining a network interface permitted as an output path of the stored data; a user attribute storage unit that stores an attribute of each user; and a reception unit that receives selection of the output path information associated with the storage area from the user, and receives selection of an option associated with the storage area, from a group of options limited according to the attribute of the user, among plural options for the output path information.

18 Claims, 16 Drawing Sheets

| NETWORK GROUP ID | NETWORK INTERFACE INFORMATION |
|---|---|
| GROUP 1 | LAN1 |
| GROUP 2 | LAN2 |
| GROUP 3 | Wi-Fi |
| GROUP 4 | NONE |
| GROUP 5 | LAN1/Wi-Fi |

| PATTERN ID | INPUT-PERMITTED PATH | OUTPUT-PERMITTED PATH |
|---|---|---|
| PATTERN 1 | LAN1/Wi-Fi | LAN1 |
| PATTERN 2 | LAN2 | LAN2 |
| PATTERN 3 | LAN1/LAN2/Wi-Fi | NONE |

| NETWORK GROUP ID | NETWORK INTERFACE INFORMATION | UNDESIGNATED INFORMATION |
|---|---|---|
| GROUP 6 | LAN1/Wi-Fi | LAN1 |
| GROUP 7 | LAN2 | LAN2 |

| PATTERN NAME | INPUT-PERMITTED PATH | OUTPUT-PERMITTED PATH |
|---|---|---|
| FOR INTRANET | LAN1/Wi-Fi | LAN1/Wi-Fi |
| FOR INTERNET | LAN2 | LAN2 |
| FOR Internet FAX RECEPTION | LAN1/LAN2/Wi-Fi | LAN1/Wi-Fi |

| USER ATTRIBUTE | SETTING CONTROL INFORMATION |
|---|---|
| MACHINE ADMINISTRATOR | ANY SETTING IS POSSIBLE |
| GENERAL USER | SELECTABLE ONLY FOR INTRANET |

| USER ATTRIBUTE | A FUNCTION | ... | BOX NETWORK SETTING CONTROL INFORMATION |
|---|---|---|---|
| MACHINE ADMINISTRATOR | PERMITTED | ... | ANY SETTING IS POSSIBLE |
| ROLE L | PERMITTED | ... | SELECTABLE ONLY FOR INTRANET |
| ROLE G | PROHIBITED | ... | SELECTABLE ONLY FOR INTERNET |

| USER ID | USER ATTRIBUTE |
|---------|----------------|
| USER A | MACHINE ADMINISTRATOR |
| USER B | ROLE L |
| USER C | ROLE G |
| ⋮ | ⋮ |

INFORMATION PROCESSING APPARATUS FOR CONTROLLING ACCESS RIGHTS OF STORAGE AREAS VIA DIFFERENT NETWORK INTERFACES AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-123251 filed Jun. 28, 2018.

BACKGROUND (i) Technical Field

The present invention relates to an information processing apparatus, and a non-transitory computer readable medium storing a program.

(ii) Related Art

Among information processing apparatuses, there are apparatuses that are simultaneously connectable to plural different networks through plural network interfaces. This type of information processing apparatus may be connected to both a first network handling data with high confidentiality and a second network which is not so. For example, in a case where the information processing apparatus is an expensive apparatus such as a digital multifunction peripheral, it is advantageous in terms of cost that it can be shared in the first network and the second network. In such a case, after data handled on the first network is temporarily stored in the storage area in the information processing apparatus, the data may be leaked onto the second network from the storage area.

In a system disclosed in JP5511332B, in a case of receiving a job through any network, a print control device specifies the network through which the job is received, adds information on the specified network as an attribute value of the job. In storing information in an image forming apparatus, the network information added as the attribute value of the job is stored in a management table and managed with the job. Then, in a case where a request to acquire data stored in the HDD is issued from a terminal device, the network information is added to the data by referring to the management table, it is determined whether or not a transmission condition is satisfied, based on the network information and destination network information, and data is transmitted in a case where the condition is satisfied.

SUMMARY

For example, in a case where an information processing apparatus is an expensive apparatus such as a digital multifunction peripheral or the like, which can be simultaneously connected to plural different networks through plural network interfaces and may be connected to both a first network that handles data with high confidentiality and a second network that does not, it is advantageous in terms of cost that the information processing apparatus can be shared by the first network and the second network. In such a case, after data handled on the first network is stored in the storage area in the information processing apparatus, the data may be leaked onto the second network from the storage area. As a method for avoiding such a situation, for example, it is conceivable to provide a dedicated storage area for storing data from the first network in the information processing apparatus, set an attribute related to the output path for the storage area, and control the output of data to the storage area according to its attribute. In the above-described example, as the attribute of the storage area, an attribute indicating that the network interface for the first network is permitted but the network interface for the second network is not permitted is set as the output path of the data in the storage area is considered. In this method, even in a case where there is an instruction to output the data stored in the storage area through the network interface for the second network, the instruction is not executed by control referring to the attribute.

In a case where an information processing apparatus is shared by plural users, it is convenient for each user to be able to generate a storage area for himself or a user group to which he belongs, as necessary. In this case, in a case where the administrator of the information processing apparatus sets attributes for the output path of the data associated with each storage area, the work burden on the administrator becomes large. Therefore, it is conceivable that the user who generates the storage area sets the attribute. However, in such a case, there is a possibility that a user not necessarily familiar with the network configuration or security policy, or a malicious user may make settings that are not preferable for security with respect to the storage area.

Aspects of non-limiting embodiments of the present disclosure relate to an information processing apparatus, and a non-transitory computer readable medium storing a program, capable of reducing the leakage of data in a storage area, as compared with a case of allowing the user to freely set the output path information, in a method of allowing a user to set output path information defining a network interface permitted as an output path of data in a storage area.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including plural network interfaces; a storage area for storing data, which is associated with output path information defining a network interface permitted as an output path of the stored data; a user attribute storage unit that stores an attribute of each user; and a reception unit that receives selection of the output path information associated with the storage area from the user, and receives selection of an option associated with the storage area, among a group of options limited according to the attribute of the user, among plural options for the output path information.

BRIEF DESCRIPTION OF THE DRAWINGS

Exemplary embodiment(s) of the present invention will be described in detail based on the following figures, wherein.

DETAILED DESCRIPTION

Apparatus Configuration

Figure 1:
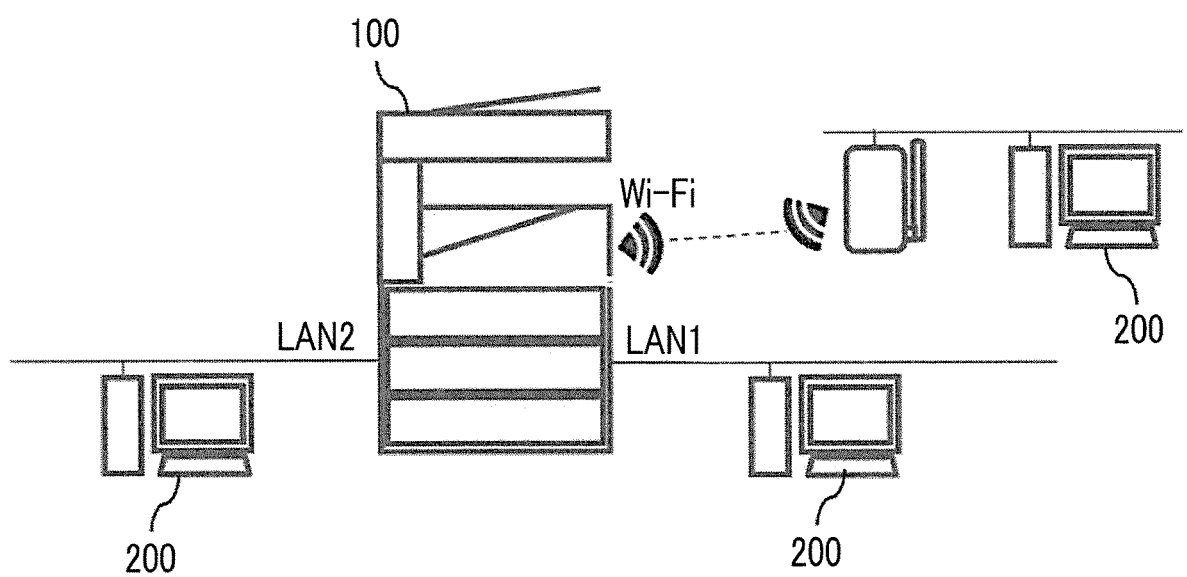
FIG. 1 shows an example of a network environment to which a multifunction peripheral 100 as an exemplary embodiment of an information processing apparatus according to the present invention is connected.

FIG. 1 shows an example of a network environment to which a multifunction peripheral 100 as an exemplary embodiment of an information processing apparatus according to the present invention is connected.

In this example, the multifunction peripheral 100 includes three built-in network interfaces, and is connected to three different networks of LAN1, LAN2, and Wi-Fi (registered trademark), through the network interfaces. A computer 200 such as a personal computer (PC) or a mobile terminal on each network exchanges data with the multifunction peripheral 100 through a network to which each computer 200 is connected. Note that the multifunction peripheral is a device having functions of a printer, a scanner, a copier, a facsimile, and the like.

Figure 2:
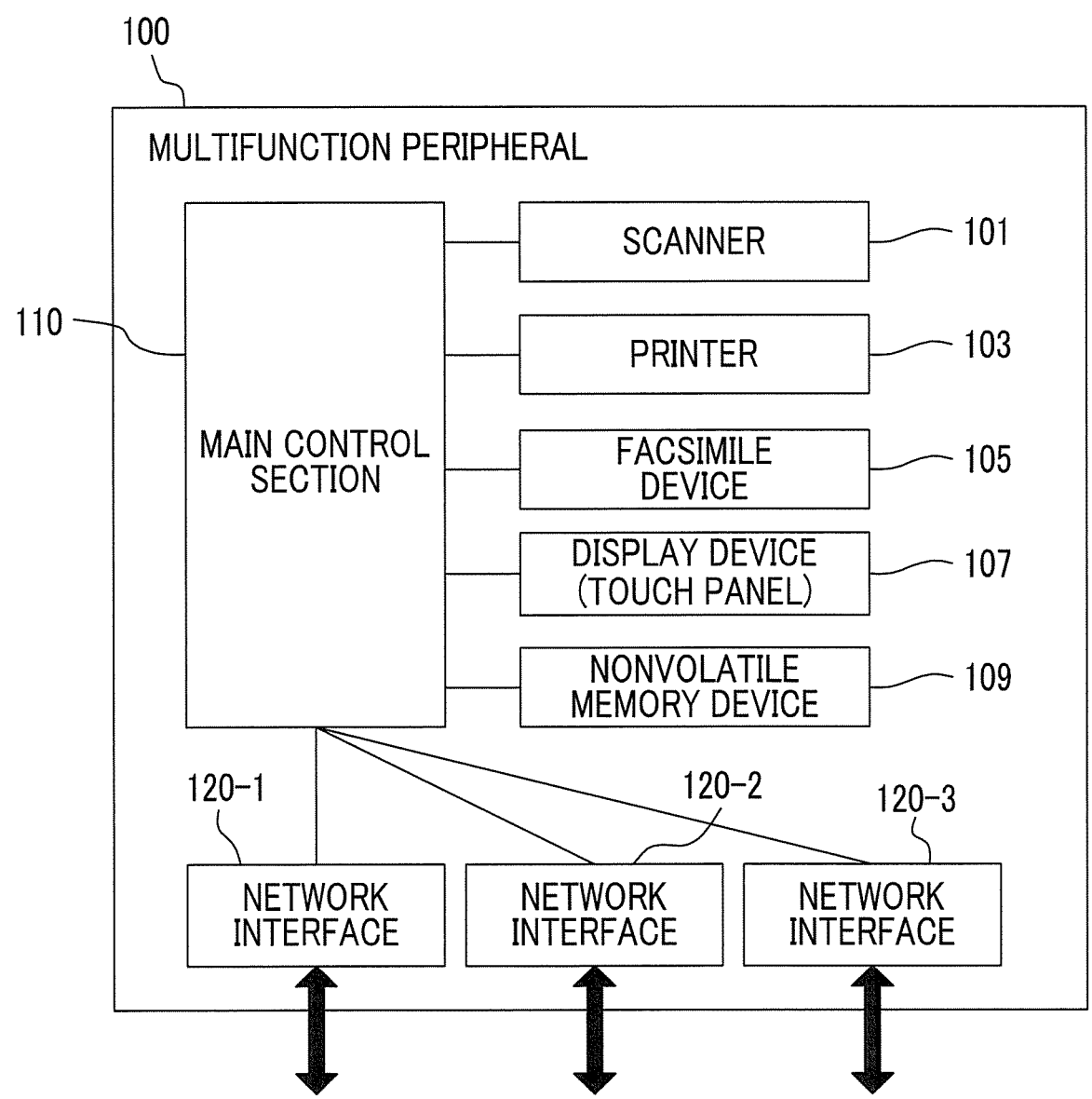
FIG. 2 is a diagram illustrating an internal configuration of the multifunction peripheral.

FIG. 2 shows an example of the internal configuration of the multifunction peripheral 100. The multifunction peripheral 100 includes a scanner 101, a printer 103, a facsimile device 105, a display device 107, a nonvolatile memory device 109, a main control section 110, network interfaces 120-1, 120-2 and 120-3 (they are collectively referred to as "network interface 120").

The scanner 101 optically reads an image of a document and generates image data representing the image. The printer 103 prints the image represented by the image data on paper. A copy process is realized by causing the scanner 101 and the printer 103 to cooperatively operate. The facsimile device 105 transmits and receives facsimile. The display device 107 is a device that displays a screen for user interface (UI) of the multifunction peripheral 100. In this example, the display device 107 is configured as a touch panel type device and also serves as an input device (although this is merely an example). The nonvolatile memory device 109 is a memory device that retains the storage even in a case where the power supply is turned off, and a hard disk drive or a flash memory is an example thereof.

The main control section 110 is a device that controls the operation of the multifunction peripheral 100, and includes a computer that processes data and a control program that the computer executes. The main control section 110 receives the user's input to the UI screen displayed on the display device 107, and controls the scanner 101, the printer 103, the facsimile device 105, and the like in accordance with the input, thereby realizing the process instructed by the user. Further, the main control section 110 is connected to the network through the network interfaces 120-1, 120-2 and 120-3, and exchanges instructions and data with the computers on the network. In the example of FIG. 1 and FIG. 2, it is assumed that the network interface 120-1 is connected to the LAN1, the network interface 120-2 is connected to the LAN2, and the network interface 120-3 is connected to the network through Wi-Fi. For the following explanation, in this example, at least LAN1 and LAN2 are assumed to be different networks. Further, it is assumed that the network to which the multifunction peripheral 100 is connected through Wi-Fi is connected to the LAN1.

The multifunction peripheral 100 has a function of storing image data, print data described in page description language, or electronic document data (hereinafter simply referred to as "document") such as files generated by various applications in the nonvolatile memory device 109.

Plural document storage areas can be provided in the multifunction peripheral 100. There is no particular limitation on the specific realization method of the storage area. For example, the individual storage areas may be one folder managed by the file system of the main control section 110, or one logical partition or logical drive set for the nonvolatile memory device 109. Further, plural nonvolatile memory devices 109 (physical drives) may be provided in the multifunction peripheral 100, and these individual physical drives may be defined as separate storage areas. In addition, storage areas of these illustrated types may be used in combination. In the following, individual storage areas are figuratively called "boxes". In order to limit users accessible to individual boxes, it is also possible to set passwords for the boxes or to define the access authority of each user to the box by an access control list.

The main control section 110 has a function of controlling the input (storage, accumulation) and output (retrieve) of a document to and from such a box.

In the box, a document (image data) generated by scanning of the scanner 101, a document received by the facsimile device 105, a document input through the network, and the like are stored. Further, the document stored in the box is output in a form such as print output from the printer 103, transmission by the facsimile device 105, or transmission through the network.

Although the illustrated multifunction peripheral 100 is connected to plural different networks, the requirements regarding security may be different for each of the networks. For example, in an office, networks are divided depending on departments that handle highly confidential data and departments that do not, so that a case where the staff of the latter department cannot access highly confidential data through the network is the example. Even in such a case, it is difficult to install an expensive multifunction peripheral 100 for each department, and one multifunction peripheral 100 may be shared by plural departments. In such a case, the multifunction peripheral 100 is connected to a network of departments with strict security requirements (referred to as "first department" for convenience) and a network of other departments. In order to satisfy the security requirements of the former department, a box dedicated to the former department needs to be prepared as a box (storage area) in the multifunction peripheral 100 to prevent documents stored in the box from leaking out to the network of the latter department.

For example, the network of the first department and the network of another department different from the first department may use the same network address as the private IP address. In such a case, it is not possible to restrict the access to the boxes in the multifunction peripheral 100 or restrict the transfer of the document in the box by using an IP address. As a countermeasure, for example, at the time of transmitting a document in the box, in a case where a user, who instructs the transmission, designates a network interface 120 through which transmission is to be made, it is possible to prevent the document in the box from leaking out to the unexpected network. However, designating a network interface 120 through which transmission is to be made is a request with high difficulty for general users, there is a high possibility of leading to user confusion or incorrect selection.

Therefore, in the present exemplary embodiment, there is provided a mechanism for performing control such that documents stored in the box are prevented from leaking out to a network not permitted for security. This mechanism will be described below.

Figures 3, 4:
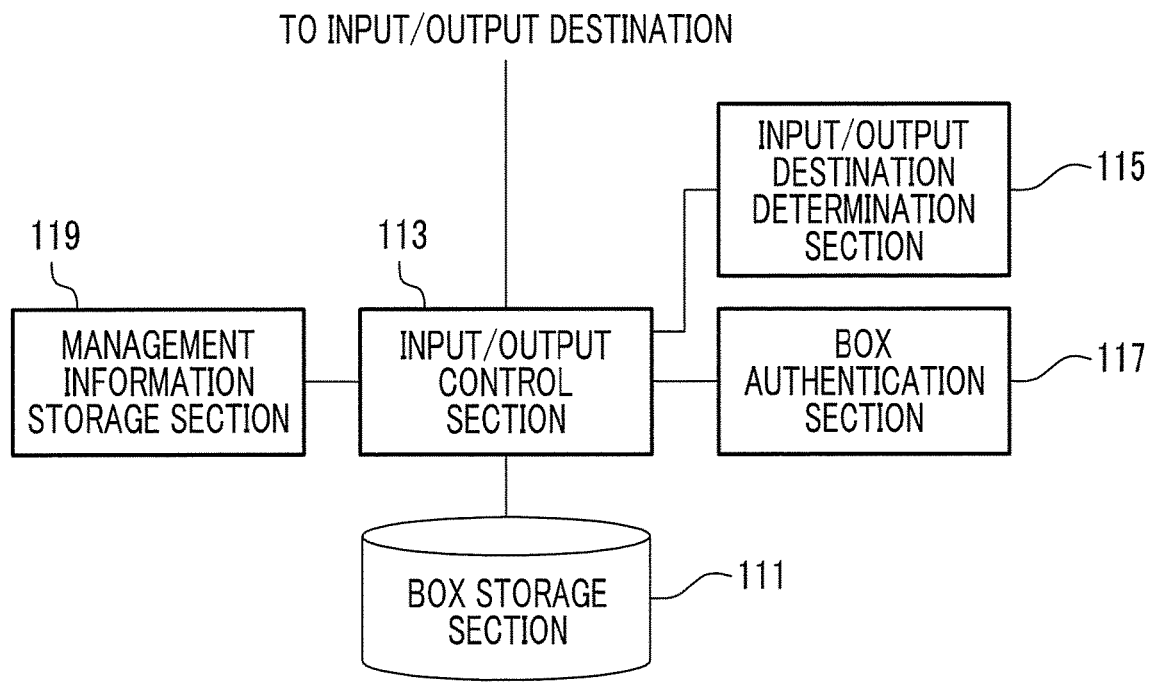
FIG. 3 is a diagram illustrating a mechanism for controlling documents stored in a box so as not to leak out to a network that is not permitted by security.
FIG. 4 is a diagram showing an example of a data structure of input/output path access authority information.

FIG. 3 shows the function group of the main control section 110 for this mechanism. The box storage section 111 stores information on one or more boxes and information on documents stored in each box. The input/output control section 113 controls input (storage) or output (such as transfer and printing) of a document to or from the box storage section 111.

The input/output destination determination section 115 determines the input source of the operation instruction or the input of the document to the box, and the output destination of the document in the box. The input source of the operation instruction to the box includes a local UI (that is, the display device 107) and a device on the network. Since the device on the network communicates with the main control section 110 through any one of the plural network interfaces 120, the input/output destination determination section 115 determines which one of the local UI and the plural network interfaces 120 the incoming operation instruction has been received from. Similarly, in a case where a document is input to the box, the input/output destination determination section 115 determines which one of the local scanner 101 and the facsimile device 105 (facsimile reception) or the plural network interfaces 120 the input source is. In a case of receiving an instruction to output a document in the box, the input/output destination determination section 115 determines which one of the local printer 103, the facsimile device 105 (facsimile transmission), and the plural network interfaces 120 the output destination is.

The box authentication section 117 performs authentication for access to the box of the user and authentication for inputting (storing) the incoming document to the box. The authentication is performed by using the password set in a box to be operated or to which a document is input, for example. In other words, in a case where the user intends to start an operation on the box, the user is prompted to input a password, and in a case where a correct password is input according to it, the operation from the user is permitted. In the case of facsimile reception addressed to the box, in a case where the password attached to the received document matches the password set in the box, the document is permitted to be accumulated in the box. In a case where the access control list is set for the box, a user authentication mechanism (not shown) performs user authentication for the user who intends to perform the operation of the multifunction peripheral 100, and the box authentication section 117 permits the user specified by user authentication to operate on the box within the range of authority permitted by the access control list for the box. For example, in a case where the authority to accumulate and print documents is granted, but the authority to transfer documents through facsimile or network is not granted for the user for the box, the transfer instruction from the user is not permitted. In addition, in a case where no password is set in the box and access control by the access control list is also not performed, the user is permitted to perform all operations on the box (however, an operation restriction to be described later corresponding to the input/output destination of the document to/from the box related to the operation is separately received).

The management information storage section 119 retains management information used for control of the input/output control section 113 with respect to input/output to/from the box. The retained management information includes box input/output information indicating permission/non-permission for input/output from each input/output destination for each box. For example, for each box, the box input/output information defines an input source that permits an operation instruction or a document input to the box, and an output destination that permits the output of the document in the box. In this case, input from the input source and output to the output destination for which permission is not defined in the box input/output information is not permitted. Further, instead of defining the input source and the output destination to be permitted, the box input/output information may define the input source and the output destination which are not permitted. In this case, input from the input source and output to the output destination for which non-permission is not defined in the box input/output information is permitted.

Further, the box input/output information is not limited to defining separately the input source and the output destination, but may define collectively permission or non-permission for input and output to and from the box for a certain source (or the network interface 120).

In addition, from the viewpoint of preventing unintentional leakage of the document in the box, it is considered a case where the input (storage) to the box may not limited. In such a case, the box input/output information may be any one as long as it defines the output destination from the permitted box (or the output destination from the box not permitted). However, as in the example in which the multifunction peripheral 100 is connected to plural networks having different security requirements, in a case where a document from a network having a strict security requirement is accumulated in a box permitting output to a network with a loose security requirement, there is a risk of leakage to the latter network through the box. Therefore, in such a case, the input source is also defined in the box input/output information.

Further, the local input/output of the multifunction peripheral 100 (that is, not through the network), that is, the storage of the document from the scan, the facsimile or the like in the box, the printout, the facsimile transmission, and the like of the document in the box are the basic functions of the multifunction peripheral 100, and they may be permitted by default. In some specific examples shown below, it is assumed that local input/output to the box is permitted. In this case, it is assumed that the box input/output information defines permission or non-permission for input and output, with each network interface 120 as a path.

The input/output control section 113 refers to the management information such as the box input/output information and the like retained in the management information storage section 119 and controls the input and output of a document to each box in the box storage section 111.

Next, the process of the input/output control section 113 will be described using a specific example.

Figure 5:
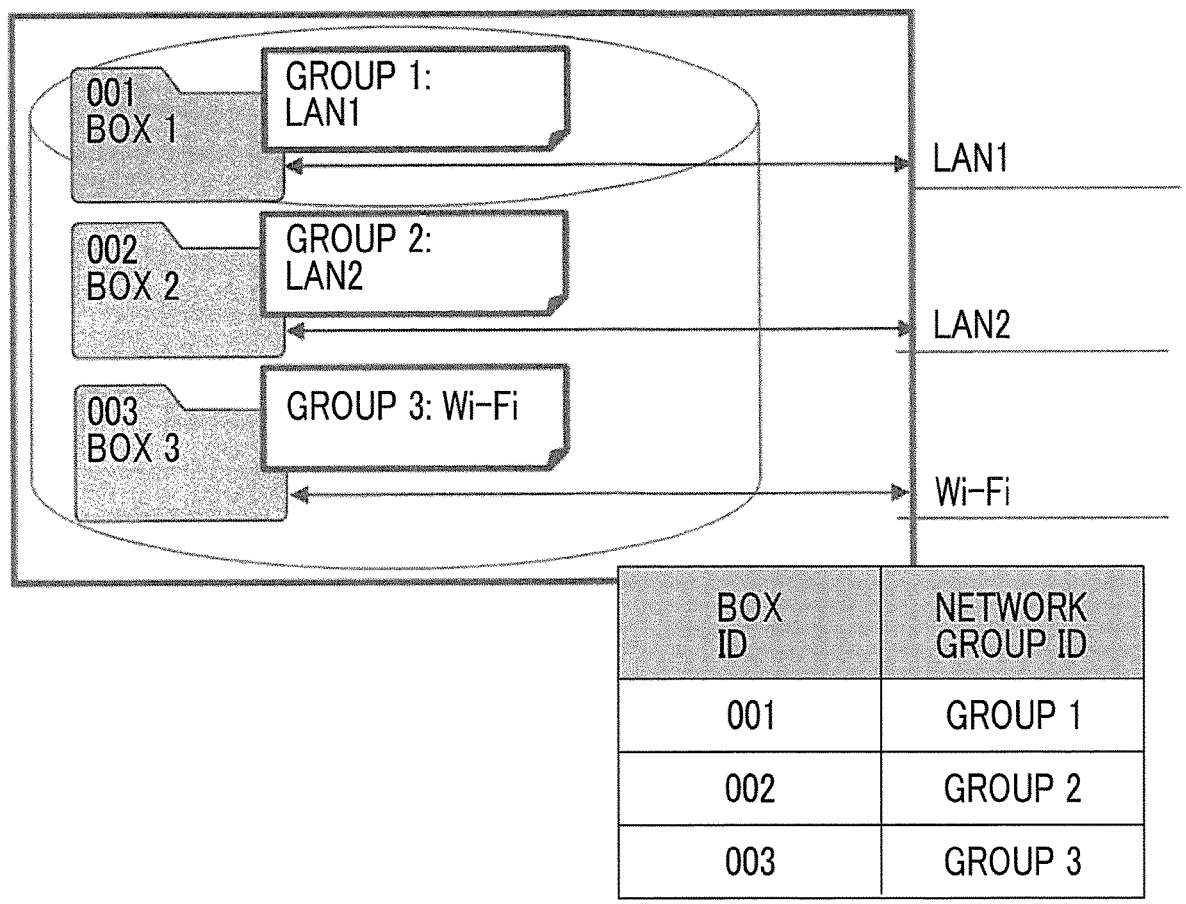
FIG. 5 is a diagram showing an example of box input/output information using the input/output path access authority information of FIG. 4.

FIG. 4 and FIG. 5 show the input/output path access authority information and the box input/output information retained in the management information storage section 119, used in one specific example. This example is the example of the case where the multifunction peripheral 100 is connected to three networks of LAN 1, LAN 2, and Wi-Fi shown in FIG. 1 (through the three network interfaces 120 corresponding thereto).

The input/output path access authority information shown in FIG. 4 is information defining a network group. This information includes the network group ID and the network interface information corresponding thereto. The network group ID is an ID for uniquely identifying the network group. The network interface information is a list of IDs of the network interfaces constituting the network group of the network group ID. In the example of FIG. 4, the "group 1" includes only the network interface 120 "(LAN 1")" (and a network leading to it) and the "group 5" includes two network interfaces 120 "LAN 1" and "Wi-Fi". The information on this group is used to indicate a group permitting input/output to the box in the box input/output information exemplified in FIG. 5. In the "group 4", the value of the network interface information is "None", which is used in a case of not permitting input and output to and from the box through the network interface 120 at all. "Group 5" is used in a case of dealing with documents that conform to similar security requirements in networks respectively connected by "LAN 1" and "Wi-Fi", for example. In a case where this group is associated with a box, documents handled (that is, stored or output) in the box are limited to those that communicate through LAN 1 and Wi-Fi.

The box input/output information shown in FIG. 5 defines the ID of the network group that is permitted to input/output to the box for each box in the box storage section 111. That is, in the examples of FIG. 4 and FIG. 5, the network interfaces 120 belonging to the network group associated with the box are permitted as both input and output paths to the box.

In the example of FIG. 5, a box named "Box 1" (box ID "001") is associated with group 1. Therefore, for the box 1, input and output through the network interface 120 with the ID "LAN 1" belonging to the group 1 is permitted, but input and output through the other network interfaces 120 is not permitted. That is, the mode of permitting the input and output of the document through the network path with respect to the box 1 is as follows.

1) Storage of documents through LAN 1 is permitted
2) Storage of document through LAN 2 or Wi-Fi is not permitted
3) Output (retrieve and transfer) of document through LAN 1 is permitted
4) Output of document through LAN 2 or Wi-Fi is not permitted In this example, since the local input/output is permitted by default, it is permitted to store the document by scanning and facsimile receiving, and output the document in the box 1 by printing and facsimile transmission.

As described above, the examples shown in FIG. 4 and FIG. 5 define a network that can use a box for each box. In this example, those that can be used for the box through the network (that is, those that can operate the box, store the document in the box, can retrieve the document in the box, or can be the transfer destination of the document) are limited to devices on the network belonging to the network group associated with the box. Therefore, each box in the multifunction peripheral 100 shared by plural networks can be separated for each network. Further, in this example, for documents stored in the box from the local (that is, from the scanner 101 or the facsimile device 105), in a case of retrieving the document from the remote computer or transferring the document to the remote computer, the box input/output information on the box is applied. Therefore, the documents stored in the box from such local are also prevented from leaking to the unintended network through the box.

Next, an example of a processing procedure executed by the input/output control section 113 will be described with reference to FIGS. 6 and 7.

Figure 6:
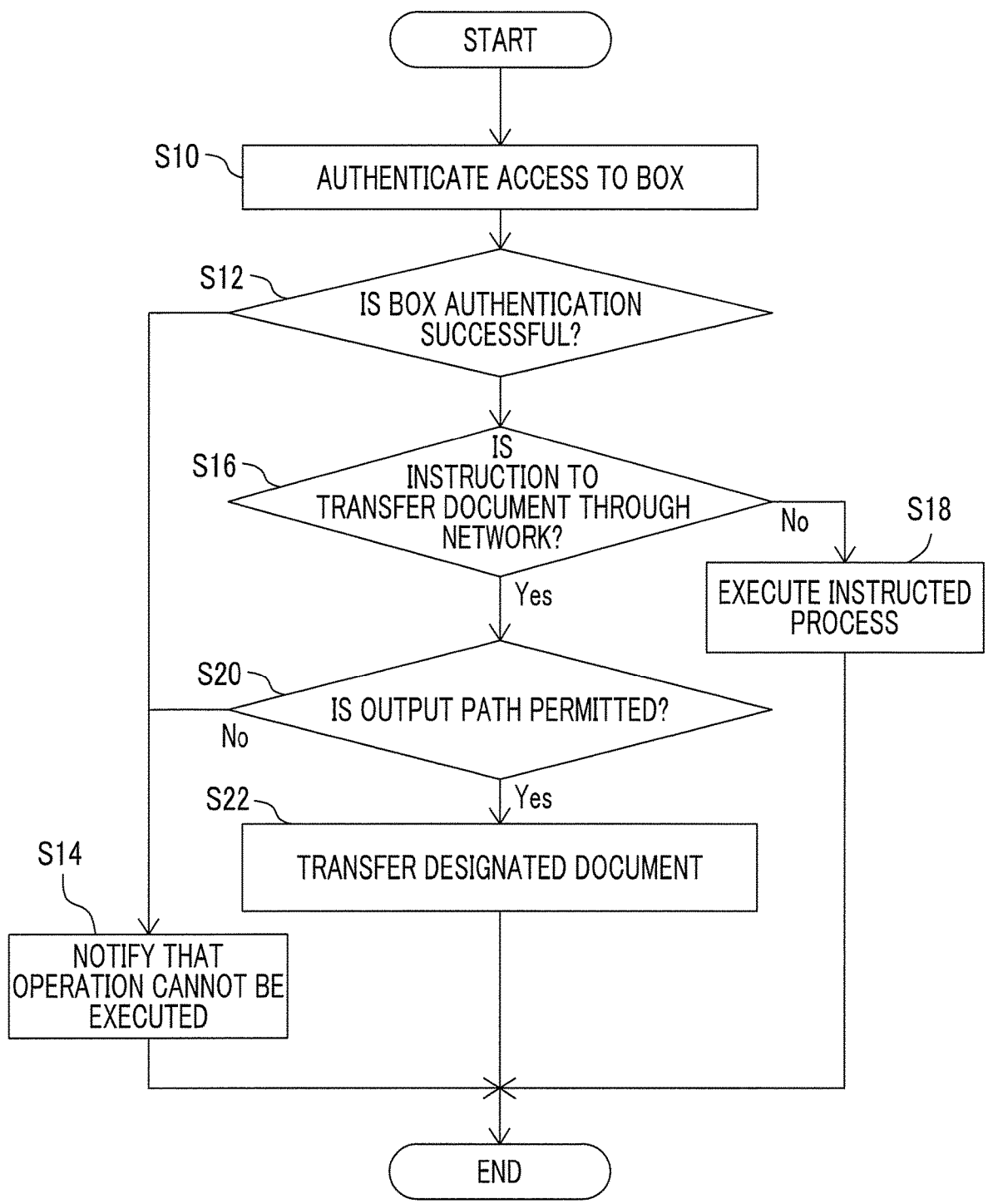
FIG. 6 is a flowchart illustrating a procedure of a process of an input/output control section for an instruction from a local user interface (UI) to a box.

FIG. 6 shows an example of a process executed by the input/output control section 113 in a case where the user designates a box on the screen of the local UI (display device 107) as an operation target. In this case, the input/output control section 113 causes the box authentication section 117 to perform the access authentication process for the box (S10). In a case where a password is set in the box, the box authentication section 117 displays a password input screen on the UI and requests the user to input a password. In response to this, in a case where the password input by the user matches the password set in the box, the box authentication section 117 makes the authentication success. In the case of a method of controlling access to the box by user authentication based access control list, the box authentication section 117 causes the user authentication mechanism (not shown) to perform login authentication of the user. In a case where this login authentication succeeds, the user ID of the user is obtained from the user authentication mechanism. Then, it is determined from the access control list of the box whether or not the user ID has any access right (authority of storing or retrieving documents to or from the box) for the box. In a case where the user has any access right for the box, the box authentication section 117 makes the authentication of S10 successful; and in a case where the user does not have any access right at all, it makes the authentication failure. The input/output control section 113 determines whether or not the authentication of the box authentication section 117 is successful (S12).

in a case where the authentication by the box authentication section 117 fails, the input/output control section 113 displays on the local UI, an error screen indicating that the operation on the designated box is not executable (S14) and ends the process.

In a case where the authentication of the box authentication section 117 is successful, the input/output control section 113 determines whether or not the instruction from the user concerning the box instructs an operation to transfer the document in the box through the network (S16). For example, in a case where a transfer operation using a network transfer protocol such as file transfer protocol (FTP) or simple mail transfer protocol (SMTP) is instructed, the determination result of S16 is Yes. In contrast, in a case where an operation other than the transfer through the network, such as printout of a document in the box, facsimile transmission, or storage of the document as a result of the scan in the box, is instructed, the determination result of S16 is No.

In a case where the determination result of S16 is No, the input/output control section 113 executes the process instructed by the user (S18). For example, in a case where the user instructs an operation to store the scanned document in the box, the input/output control section 113 receives the document generated by the scanner 101 and stores it in the box in the box storage section 111.

In a case where the determination result in S16 is Yes, the input/output control section 113 causes the input/output destination determination section 115 to determine which network interface 120 the output path to the transfer destination of the transfer (transmission) instructed by the user is. The input/output destination determination section 115 may perform the determination, for example, by determining that the address of the transfer destination (for example, IP address) is the address of a network leading to which network interface 120. Then, with reference to the management information storage section 119, the input/output control section 113 determines whether or not the network interface 120 determined by the input/output destination determination section 115 is permitted as the output path of the document in the box in the box input/output information (S20). In the case of the examples of FIGS. 4 and 5, in a case where the network interface 120 is included in the network group associated with the box, the determination result of S20 is Yes, and in a case where not included, the determination result of S20 is No.

In a case where the determination result of S20 is No, the input/output control section 113 displays on the local UI, an error screen indicating that the instructed operation is not executable (S14), and ends the process.

In a case where the determination result of S20 is Yes, the input/output control section 113 transfers the document designated as the transfer target to the designated transfer destination (S22).

Figure 7:
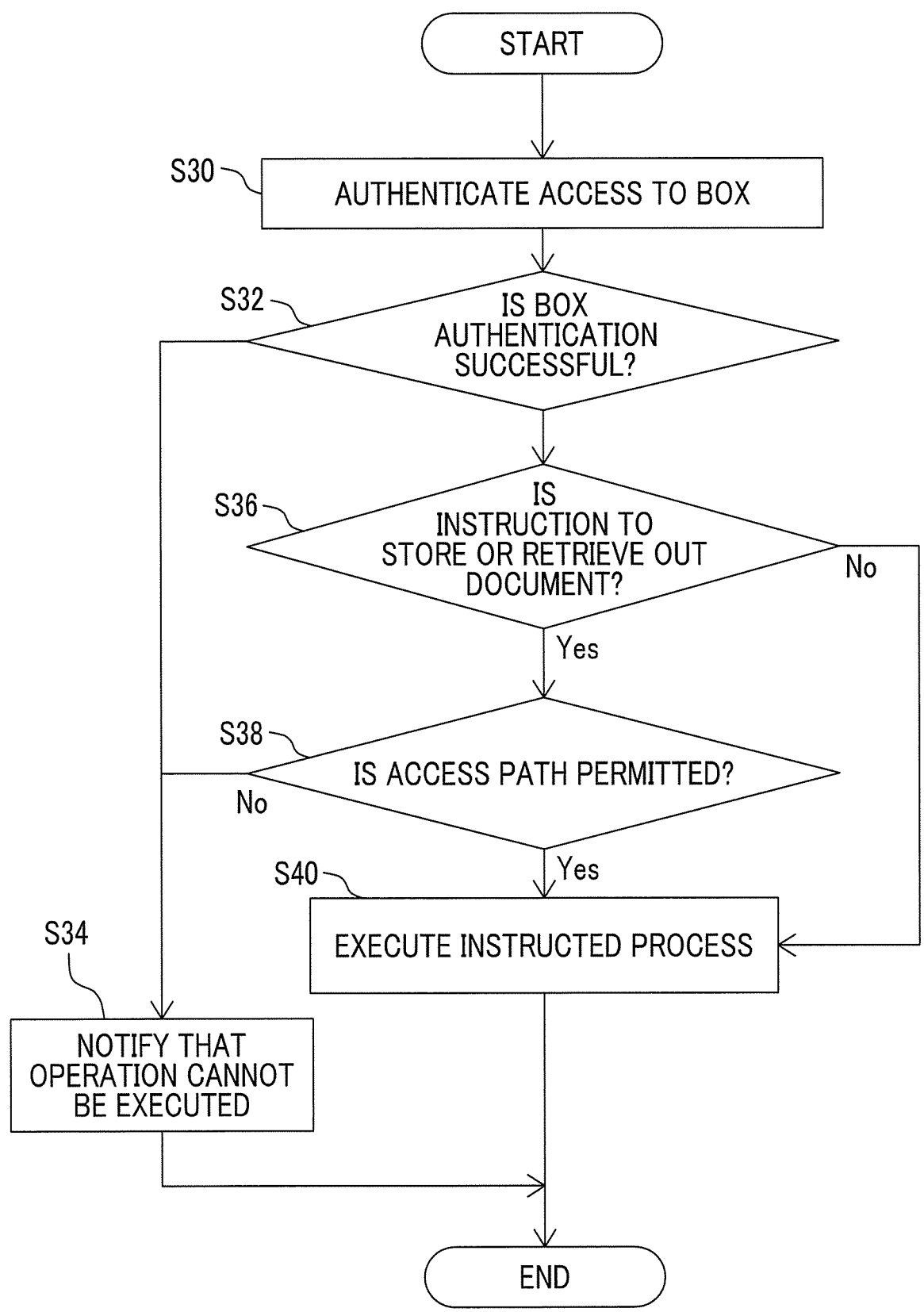
FIG. 7 is a flowchart illustrating a procedure of a process of the input/output control section for an instruction from a remote (network) to a box.

FIG. 7 shows an example of a process performed by the input/output control section 113 in a case where the user instructs an operation on a box from a remote computer connected to the multifunction peripheral 100 through a network. The operation for the box from the remote includes, for example, storing the document in the box (that is, uploading from the computer to the box), retrieving the document in the box (downloading from the box to the computer), displaying the operation screen of the box, and the like.

In this case, the input/output control section 113 causes the box authentication section 117 to perform the access authentication process for the box (S30). In a case where the instruction from the remote is a document storage instruction addressed to the box, the box authentication section 117 checks, for example, whether or not the password set in the box is included in the document storage instruction. In a case where it is included, it is determined as authentication success; or otherwise, it is determined as authentication failure. In a case of receiving a request to access a box from a remote user, the box authentication section 117 prompts the user to input the password of the box, and in a case where the correct password is input in response to the request, the authentication is assumed to be successful. In a case of a method of controlling the access to the box by the access control list, as in the case of FIG. 6, in a case where the user authentication is successful, the box authentication section 117 obtains the user ID of which login is successful from the user authentication mechanism and determines from the access control list of the box whether or not the user ID has some access right for the box. In a case where the user has any access right for the box, the box authentication section 117 makes the authentication of S30 successful.

In a case where the authentication by the box authentication section 117 fails, the input/output control section 113 displays on the remote instruction source device, an error information indicating that the operation on the designated box is not executable (S34) and ends the process.

In a case where the authentication of the box authentication section 117 is successful, the input/output control section 113 determines whether or not the instruction from the remote user concerning the box is an instruction to store (upload) the document to the box or to retrieve (download) the document in the box (S36).

In a case where the determination result of S36 is No, the input/output control section 113 executes the process instructed by the user (S40). For example, in a case where the user's instruction requests display of the operation screen of the box, information on the operation screen is transmitted to the user's computer through the network.

In a case where the determination result in S36 is Yes, the input/output control section 113 causes the input/output destination determination section 115 to determine which network interface 120 the path that receives the instruction from the remote user is. Then, with reference to the management information storage section 119, the input/output control section 113 determines whether or not the network interface 120 determined by the input/output destination determination section 115 is permitted as the input or output path of the document in the box in the box input/output information (S38). In this determination, in the case of the document storage instruction, it is determined whether or not the determined network interface 120 is permitted as an input path, and in the case of a document retrieve instruction, it is determined whether or not the network interface 120 is permitted as an output path. In the case of the examples of FIGS. 4 and 5, since the input and output are not distinguished, in a case where the network interface 120 is included in the network group associated with the box, the determination result of S38 is Yes, and in a case where not included, the determination result of S40 is No.

In a case where the determination result of S38 is No, the input/output control section 113 returns error information indicating that the instructed operation is not executable to the computer of the remote user (S34) and ends the process. In a case where the instructed operation is the storage of the document, the document received in response to the instruction is discarded at this time. In a case where the determination result in S38 is Yes, the input/output control section 113 executes an operation instructed by the user, for example, storing the document to the box or retrieving the document in the box (S40).

In the procedure shown in FIG. 7, in a case of receiving an operation instruction from the remote computer to the box, it is determined from the combination of the instruction and the network of the computer whether or not the operation related to the instruction can be permitted, but the order of instruction and determination is only an example. Instead thereof, in a case where the user accesses the box in the multifunction peripheral 100 from the remote site, the input/output control section 113 determines whether input or output of the document to or from the box is permitted, from the computer and the operation not permitted may be displayed in an unselectable state (that is, a state in which the operation cannot be selected on the screen) on the operation screen, for example.

According to the process of FIG. 7, in a case where the user accesses the box from the remote computer, even in a case where the user has access right to the box, in a case where the computer is on the network which is not permitted to input or output documents to or from the box, it is impossible to store or retrieve documents to or from the box. However, even in this case, operations on the box other than storing or retrieving documents may be permitted to some extent. In addition, in a case where a computer accessing a box is on a network which is not permitted to input or output to or from the box, even a display of the operation screen of the box may not be permitted.

Next, another example of the box input/output information retained in the management information storage section 119 will be described with reference to FIG. 8 and FIG. 9.

Figures 8, 9:
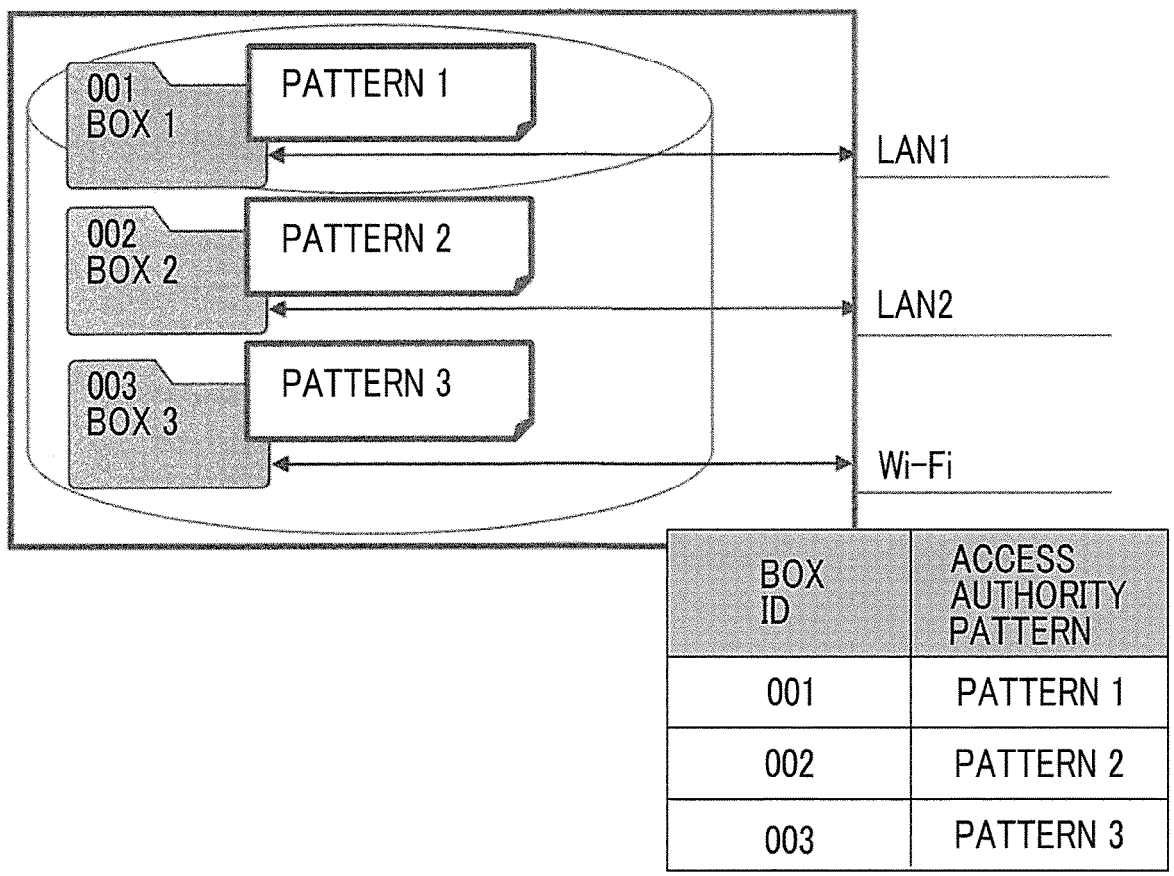
FIG. 8 is a diagram showing another example of the data structure of the input/output path access authority information.
FIG. 9 is a diagram showing an example of box input/output information using the input/output path access authority information of FIG. 8.

FIG. 8 shows an example of input/output path access authority information in this example. Unlike the example of FIG. 4, the input/output path access authority information is defined separately for an input path and an output path. That is, the input/output path access authority information of FIG. 8 defines one or more patterns, with a combination of an input-permitted path and an output-permitted path as a single pattern. The input-permitted path is one or more network interfaces 120 permitted as an input path of a document to the box, and the output-permitted path is one or more network interfaces 120 permitted as an output path of a document in the box. For example, in the pattern 3, three network interfaces 120 of LAN 1, LAN 2, and Wi-Fi are permitted as the input path to the box, but no network interface 120 is permitted as the output path ("None"). This means that the output of the document in the box is not permitted through the network at all.

The box input/output information shown in FIG. 9 defines the pattern ID of the input/output path access authority information set in the box, for each box in the box storage section 111.

In the example of FIG. 9, box 1 (box ID "001") is associated with pattern 1. Therefore, for the box 1, input (storage) of a document through two network interfaces 120 of LAN 1 and Wi-Fi and output of a document through LAN 1 are permitted. Therefore, in the case of the multifunction peripheral 100 connected to the LAN 1, the LAN 2 and the Wi-Fi illustrated in FIG. 1, the mode of permitting the input and output of the document through the network with respect to the box 1 is as follows.

1) Storing document through LAN 1 or Wi-Fi is permitted.

2) Storing document through LAN 2 is not permitted.

3) Output (retrieve and transfer) of document through LAN 1 is permitted.

4) Output of document through LAN 2 or Wi-Fi is not permitted.

The pattern 1 associated with the box 1 is handling documents requiring similar confidentiality, for example, in a network to which LAN 1 and Wi-Fi are connected, but is useful in a case where LAN 1 has higher security as a network than Wi-Fi. That is, since input of a document to the box 1 is performed once for the document, even in a case where the input from both the LAN 1 and the Wi-Fi is permitted, the risk of leakage is small, but the document is output many times for one document, so the risk of leakage is reduced by permitting only LAN 1, which is considered to have less risk of leakage than Wi-Fi.

In the case of the box 3 in which the pattern 3 is set, the mode of permitting the input and output of the document through the network is as follows.

1) Storing document through LAN 1, LAN 2, or Wi-Fi is permitted.

2) Output (retrieve and transfer) of document through LAN 1, LAN 2, or Wi-Fi is not permitted.

In the pattern exemplified in FIG. 8, only one network interface 120 is designated as the output-permitted path, but plural network interfaces 120 may be set as the output-permitted path.

The procedure of control of the input/output control section 113 based on the input/output path access authority information and the box input/output information illustrated in FIG. 8 and FIG. 9 may be the same as the procedure shown in FIG. 6 and FIG. 7.

Next, an example of output control of a document in a box using undesignated information will be described.

There are cases where plural network interfaces 120 permitted as document output paths are set for the box. For example, in a case where there is a box in which group 5 of FIG. 4 is set, the box corresponds to this case. In the case of transferring a document in the box through a network, there is a case where a document can be transferred to the transfer destination even in a case where any one of the plural network interfaces 120 set as an output path is used. In this case, in a case where the user instructing the transfer does not explicitly designate the network interface 120 which is the path of the document transfer, the document is transferred through the one selected by the operating system among the plural network interfaces 120. However, for example, as the relationship between the LAN 1 and the Wi-Fi exemplified above, the plural network interfaces 120 set in the box as the paths for which document output is permitted are connected to the same network, but there may be superior or inferior in terms of a risk of leakage of transfer data. In this case, the network interface 120 selected by the operating system from the plural network interfaces 120 is not always better in terms of the risk of leakage.

As described above, the case where the user does not designate the network interface 120 as the path of document transfer is described as an example. However, for example, in a case where a processing flow including document transfer (an instruction described in JP2013-138284A is an example thereof) is applied to a box, in the processing flow, the name, address, or the like of the transfer destination apparatus is described, but a network interface through which transmission is to be made is often not defined in many cases. Therefore, the same situation may occur in a case where the processing flow is used for a box.

In order to prevent such a situation, in this example, undesignated information can be set for the box. The undesignated information defines the network interface 120 used as the output path in a case where the network interface 120 of the output path in a case of transferring the document in the box through the network is not explicitly designated by the user, the processing flow, or the like.

Figures 10, 11:
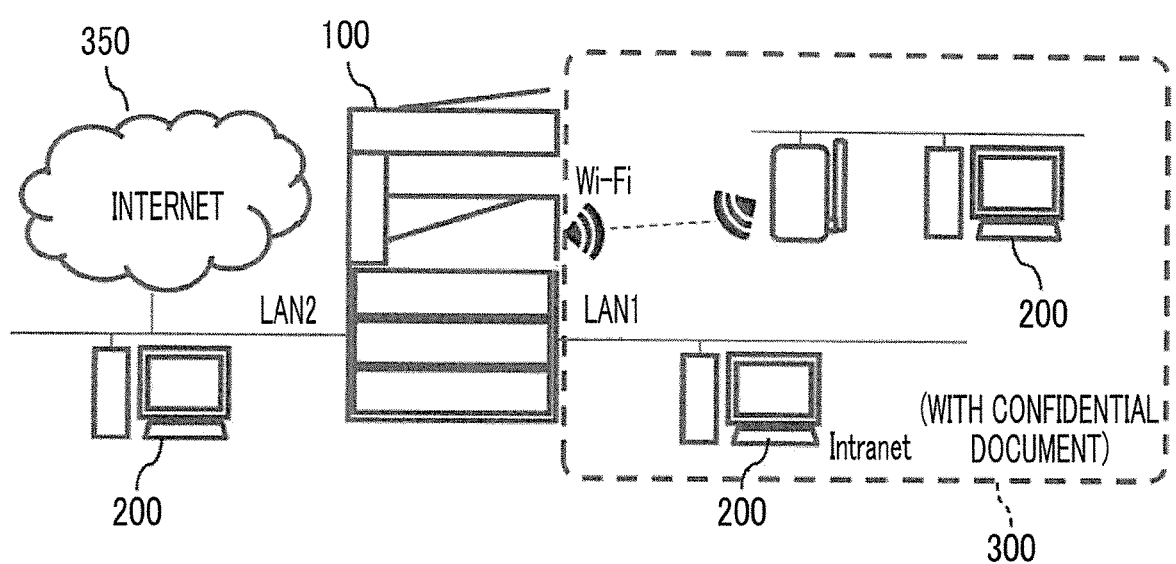
FIG. 10 is a diagram showing an example of a data structure of input/output path access authority information including items of undesignated information.
FIG. 11 is a diagram illustrating a network environment to which the apparatus of the exemplary embodiment is applied.

FIG. 10 shows an example in which an undesignated information item is added to the input/output path access authority information of FIG. 4. The network interface 120 indicated in the undesignated information item is selected from one or more network interfaces 120 indicated in the item of network interface information. In the illustrated example, the box for which the group 6 is set is permitted to store, retrieve, and transfer documents through the LAN 1 and Wi-Fi, but in a case where a network interface 120 through which transfer is to be made in the transfer instruction of document in the box is not designated by the user, or the like, the input/output control section 113 selects the LAN 1 defined in the undesignated information as a path in a case of transfer relating to the instruction.

By such control, in a case where the network interface 120 as the path in the transfer of the document in the box is not explicitly designated, it is prevented the network interface 120 which is inferior in terms of leakage or the like from being selected as the path by the operating system.

In the above exemplary embodiment and its modification examples, the network interface 120 through which transfer is to be made in transferring documents in the box is explicitly designated by the user, but in a case where the network interface is not permitted as an output path in the box input/output information for the box, the input/output control section 113 does not perform the transfer and responds to the user that execution is not executable.

FIG. 10 shows an example in which an undesignated information item is added to the input/output path access authority information of FIG. 4, but the undesignated information item can also be added to the input/output path access authority information of FIG. 8 and operated, similarly.

Exemplary Embodiment of Setting of Box Input/Output Information

In a case where setting of box input/output information is inappropriate, there is a danger that information leaks to an unintended network through the box. Therefore, for example, it is desirable that the setting of box input/output information for the box is performed by a person having knowledge of the network environment around the multifunction peripheral 100, such as an administrator of the multifunction peripheral 100.

However, in a case where the person who can set the box input/output information is restricted to the administrator or the like, there are instances where setting cannot be performed in a case where there is no administrator, so it is highly convenient to allow general users to be able to set box input/output information. For example, in a case where the general user is permitted to open (generate) a box in the multifunction peripheral 100, it is necessary to set the box input/output information in order to make the opened box available, but it is convenient for the general user to make settings.

In a case where the setting of box input/output information is widely permitted to a general user, there is a risk that inappropriate settings are intentionally made such as not being suitable for the purpose or being not preferable for security due to lack of knowledge of a setting person or due to information leaking through the box. Therefore, in the following, a mechanism for preventing inappropriate setting of box input/output information by general users and the like will be exemplified.

FIG. 11 shows an example of a network environment to which this mechanism is applied.

Even in the example of FIG. 11, similarly to the example of FIG. 1, the multifunction peripheral 100 is connected to three different networks, that is, LAN 1, LAN 2, and Wi-Fi through three network interfaces. A computer 200 on each network exchanges data with the multifunction peripheral 100 through a network to which each computer 200 is connected. The LAN 2 is connected to the Internet 350. The LAN 1 and the Wi-Fi are included in an intranet 300 which handles confidential documents, and are not connected to the Internet 350.

Figures 12, 13:
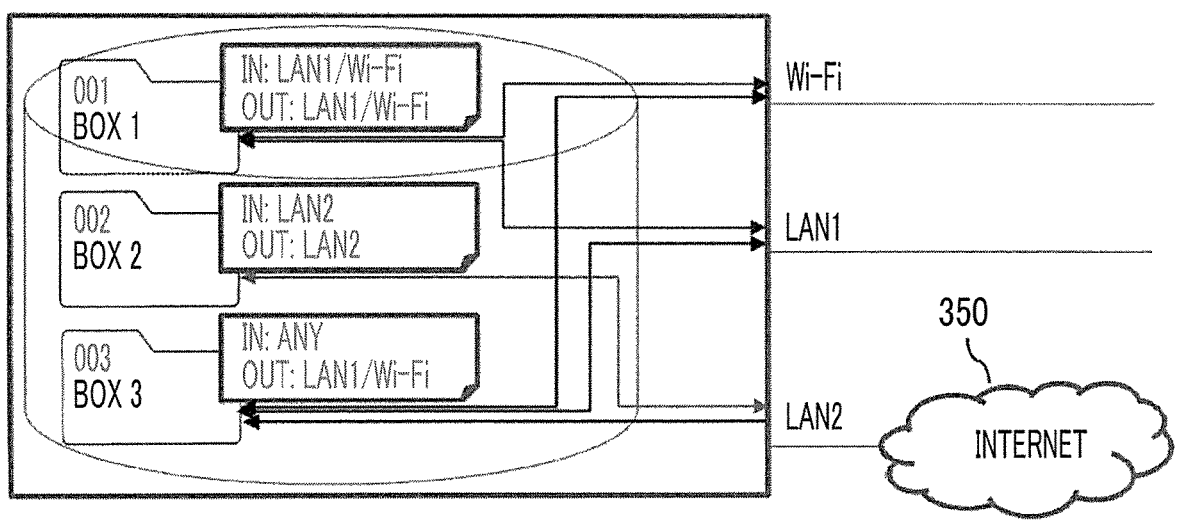
FIG. 12 is a diagram illustrating box input/output information set in a box, and input/output relations of each box and each network.
FIG. 13 is a diagram illustrating a pattern of the box input/output information.

In FIG. 12, box input/output information set in each box in the multifunction peripheral 100 is illustrated. In this example, the box input/output information indicates an input-permitted path (denoted as "IN" in FIG. 12) through which a document can be input and an output-permitted path (denoted as "OUT" in FIG. 12) through which a document can be output, for the corresponding box. A box 1 (ID=001) is used only in the intranet 300 which handles confidential documents, a pattern in which both the input-permitted path and the output-permitted path are LAN 1 and Wi-Fi are set as box input/output information is set. A box 2 is used in LAN 2 not handling confidential documents, and a pattern in which both the input-permitted path and the output-permitted path are LAN 2 is set. In a box 3, a pattern in which the input-permitted path is "any path may be used" (denoted as "ANY" in FIG. 12), and the output-permitted path is LAN 1 and Wi-Fi is set. The box 3 is provided for receiving a document to be used in business or the like in the intranet 300 from the outside, for example, from a terminal on the Internet 350. In this example, it is assumed that any one of the three patterns shown can be set as box input/output information.

These three patterns are organized in FIG. 13. As shown in FIG. 13, the pattern set in the box 1 is identified by the pattern name "for Intranet". The pattern set in the box 2 is identified by the pattern name "for Internet", and the pattern set in the box 3 is identified by the pattern name "for Internet Fax reception". The "for Internet FAX reception" pattern includes all the network interfaces LAN 1, LAN 2, and Wi-Fi owned by the multifunction peripheral 100 as input-permitted paths and includes the network interfaces LAN 1 and Wi-Fi on the intranet 300 side as output-permitted paths. The pattern name "for Internet Fax reception" means that documents used in the business on the intranet 300 side can be transmitted to and stored in the box through the Internet using Internet FAX.

In such an environment, in a case where the user can randomly select box input/output information from these three patterns, there are the following problems.

First, there is a possibility that a user with poor knowledge of the network environment sets a pattern that does not suit his purpose by mistake. For example, a case where the user who opens (generates) a box for use in a business within the intranet 300 sets by mistake the pattern of box 2 (for Internet) exemplified in FIG. 12 as the box input/output information of the box is an example. In this example, the user cannot access the box from within the intranet 300, and the intended purpose of use from within the intranet 300 cannot be achieved.

Secondly, there is a possibility that a malicious user may set a pattern that can be a security hole. For example, it is conceivable that a user performing a business of handling a confidential document in the intranet 300 intentionally sets a pattern for the Internet in the box input/output information of the box opened by himself/herself. The box to which this setting is made can be accessed from the outside (for example, outside the company) through the Internet 350. The user can scan confidential documents on business by the multifunction peripheral 100, store the confidential documents in the box, and retrieve the confidential documents in the box from the outside the company through the Internet 350.

In order to deal with such a problem, this example provides a mechanism for limiting the range of user-configurable box input/output information according to the attribute of the user. As an example of the attribute of the user, for example, there is an attribute indicating a difference in roles of the user with respect to the multifunction peripheral 100, such as an administrator of the multifunction peripheral 100 and a general user. Another example of the user attribute is the role of the user in the company. This role is defined by, for example, a department to which the user belongs, a participating task team, a position, or a combination thereof.

Figures 14, 15:
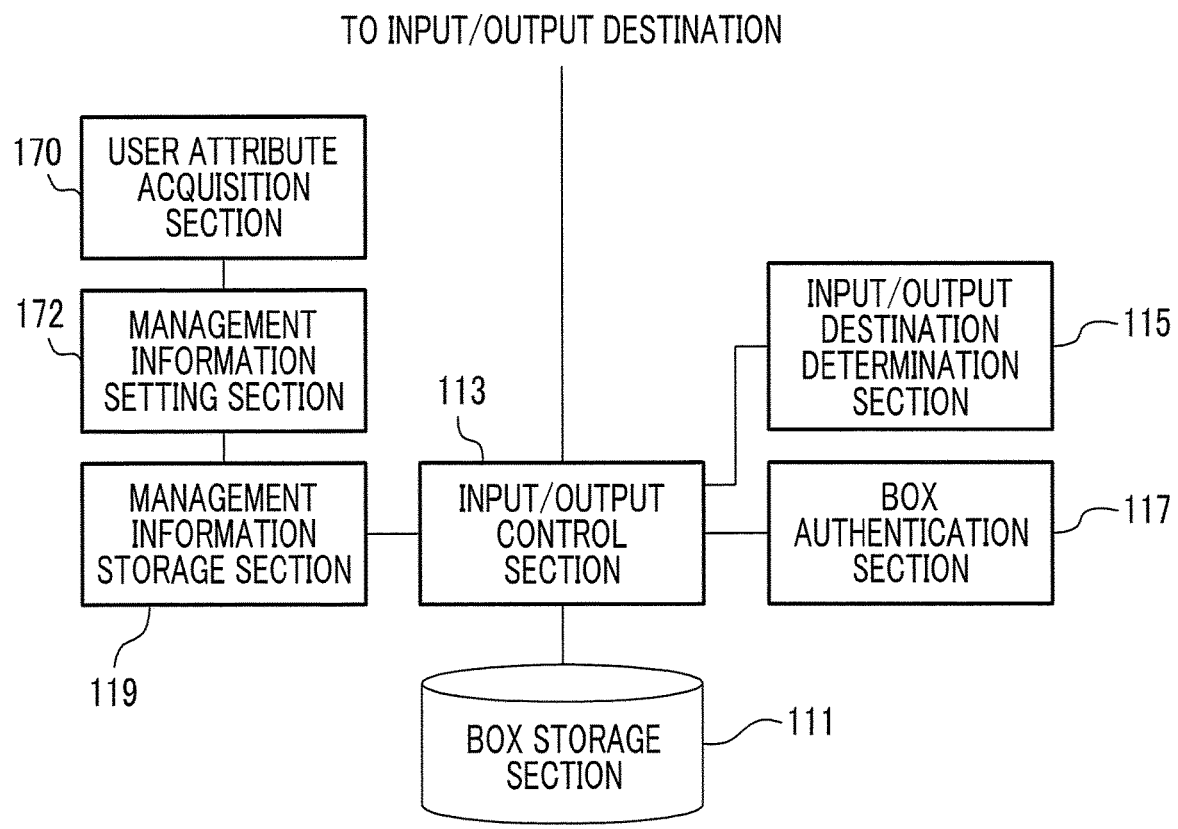
FIG. 14 is a diagram illustrating a mechanism of a main control section that performs a process of the exemplary embodiment.
FIG. 15 is a diagram illustrating a setting rule of the box input/output information according to an attribute of a user.

The functional configuration of the main control section 110 in this example is illustrated in FIG. 14. In the example of FIG. 14, in addition to the configuration shown in FIG. 3, the main control section 110 includes a user attribute acquisition section 170 and a management information setting section 172.

The user attribute acquisition section 170 acquires user attribute information from the user information database retained in the multifunction peripheral 100 or in a server accessible from the multifunction peripheral 100. The management information setting section 172 sets management information such as box input/output information retained in the management information storage section 119 in response to the instruction from the user. In this example, the management information setting section 172 acquires the attribute of the user performing the setting operation of the box input/output information by the user attribute acquisition section 170 and performs control to limit the pattern of the box input/output attribute that the user can select according to the attribute. For this control, the management information setting section 172 has, for example, a setting rule exemplified in FIG. 15. The setting rule defines setting control information indicating a range of patterns that can be selected as box input/output information, with respect to two types of user attributes, namely, the machine administrator (administrator of the multifunction peripheral 100) and the general user. According to the setting rule of FIG. 15, the machine administrator can randomly select the three patterns shown in FIGS. 12 and 13, whereas the general user can select only a pattern "for Intranet" among these three patterns. That is, in this example, a pattern in which a box may be connected to the Internet 350 cannot be selected by general users. Therefore, it is impossible for general users to make settings that may cause a document to leak out from the box to the Internet 350 due to lack of knowledge or malice.

An example of a process executed by the management information setting section 172 in a case where an instruction to set box input/output information is received from a user operating the local operation panel of the multifunction peripheral 100 will be described below. In the following description, it is assumed that the user has already logged in to the multifunction peripheral 100, and the management information setting section 172 has checked that the user has an authority to set the box input/output information for the box that is the target of the setting instruction. For example, in a case where box input/output information is set for a box newly opened (generated) by the user, or in a case of changing the setting of the box input/output information which is set in the box opened by the user in the past (therefore, the user has an authority to change the setting of the box), the user has an authority to set the box input/output information of the box.

In a case of receiving an instruction to set box input/output information from the user, the management information setting section 172 instructs the user attribute acquisition section 170 to acquire the attribute of the user. According to this instruction, the user attribute acquisition section 170 acquires the attribute of the user, and passes the acquired attribute to the management information setting section 172. Next, the management information setting section 172 acquires the setting control information corresponding to the received attribute of the user from the setting rule (see FIG. 15), and displays a selection screen 400 (see FIG. 16) showing the selectable pattern indicated by the setting control information as an option on the display device of the multifunction peripheral 100. On the selection screen 400, for example, a selection field 404 in which options of patterns of box input/output information to be set in the box are arranged in association with the image 402 indicating the box to be set is displayed. The illustrated example is for a case where the user attribute is a general user. The last two out of the three options "for Intranet", "for Internet", and "for Internet Fax reception" shown in the selection field 404 are in a state of not being selectable (gray out) according to the setting control information of the general user in the setting rule (FIG. 15), and the only selectable "for Intranet" is in a state of being selected. In a case where the attribute of the user who is currently performing setting is a machine administrator, all three options are displayed in a selectable state in the selection field 404, and the user selects an option that the user wants to select from among the options and decides the setting by pressing a decision button (not shown) on the selection screen 400.

In a case of receiving an instruction to open a new box from the user, the main control section 110 may display the selection screen 400 of the box input/output information without fail as a part of the function setting for the box. Only after the setting of the box input/output information for the screen is completed, the box or the network function of the box may be controlled so as to be validated. The term "box is validated" here means that the box becomes usable. Further, "the network function of the box is validated" means that the input and output to and from the box through the network are possible or the output of the document in the box through the network is possible.

Figures 16, 17:
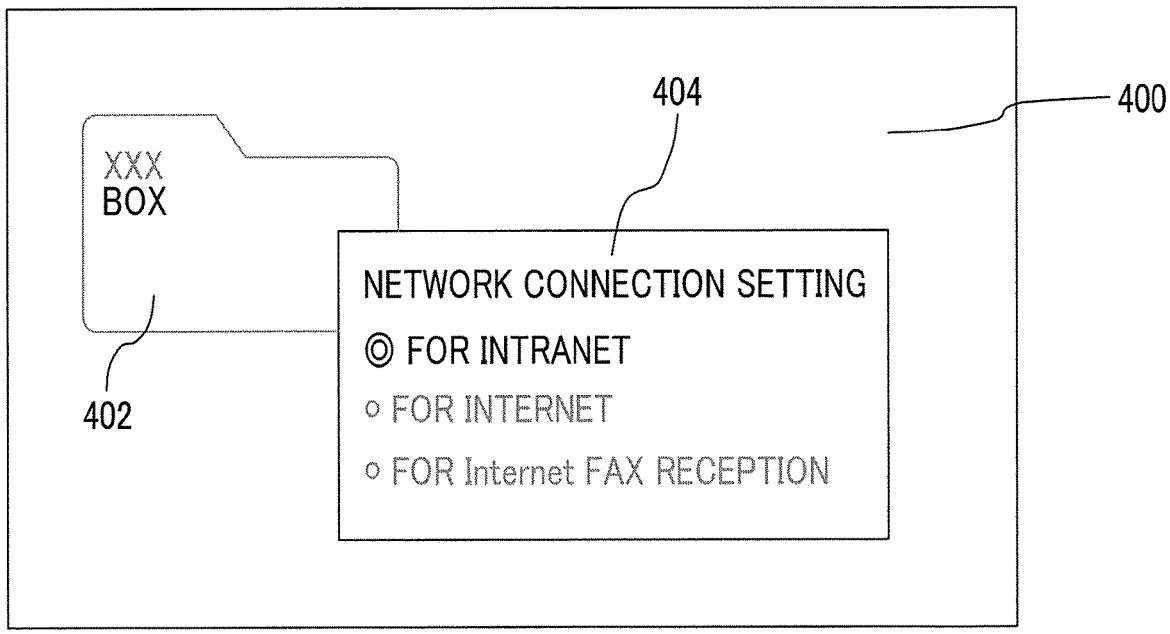
FIG. 16 is a diagram illustrating a selection screen for network connection setting (setting of the box input/output information) for a box.
FIG. 17 is a diagram illustrating contents of an authority database including another example of the setting rule of the box input/output information according to the attribute of the user.

Next, an example of a case where attributes of general users are subdivided is shown. In this example, as shown in FIG. 17, there are role L and role G as user attributes other than the machine administrator. FIG. 17 shows an example of contents of an authority database in the multifunction peripheral 100 or in a database accessible from the multifunction peripheral 100. In this example, the setting rule shown in FIG. 15 is included in the information retained in the authority database. In the authority database, information on the authority of the user having that attribute with respect to various functions provided by the multifunction peripheral 100 and other servers and devices on the network is registered in association with the user attribute. The authority information on the function includes, for example, a distinction as to whether use of the function is permitted or prohibited, a level of use authority for the function, and the like. In this authority database, information indicating the range of the pattern of the box input/output information which can be set for the box by the user having the user attribute is registered as the box network setting control information. In the example of FIG. 17, the machine administrator can set all three patterns for the box identical to the box in the example of FIG. 15, but it is stated that only "for Intranet" can be set for the user of role L and only "for the Internet" can be set for the user of role G. For example, a role L may be assigned to a user who performs a business of accessing the intranet 300, and a role G may be assigned to a user who does not need access the intranet 300 and performs a business on the LAN 2 side.

Figures 18, 19:
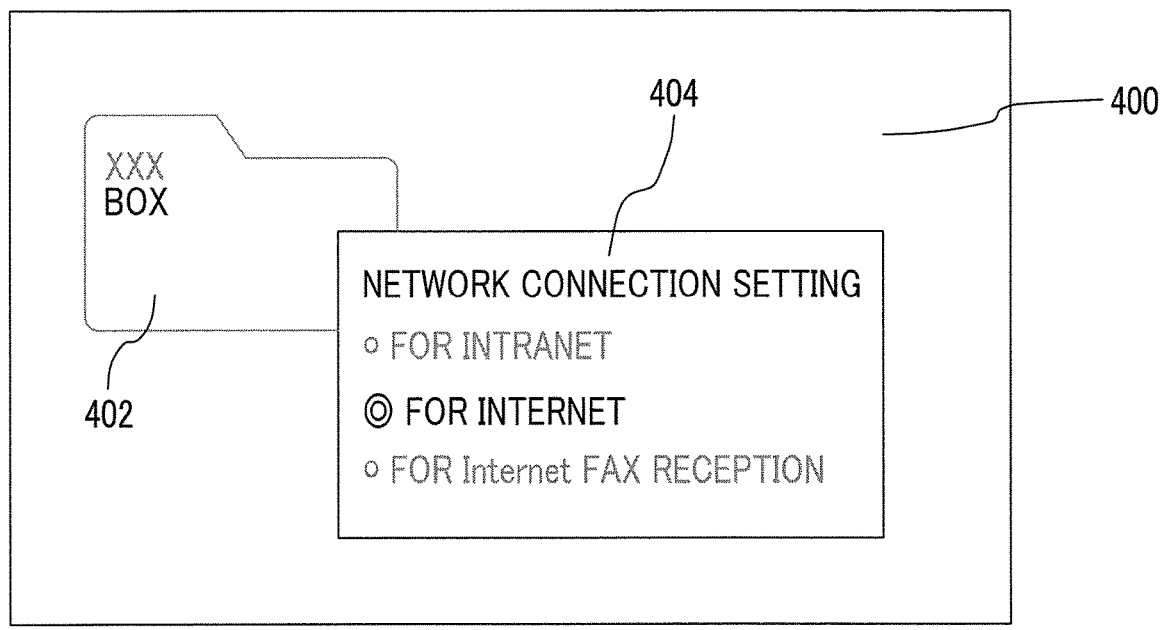
FIG. 18 is a diagram illustrating information on user attributes in a user information database.
FIG. 19 is a diagram illustrating a selection screen for network connection setting for a box.

As shown in FIG. 18, in the user information database in the multifunction peripheral 100 or in the server accessible from the multifunction peripheral 100, the user attribute of the user is retained in association with the user ID of each user.

The management information setting section 172 refers to the authority database of FIG. 17 instead of the setting rule of FIG. 15 to specify the box network setting control information corresponding to the attribute of the user, and generates a selection screen 400 of a pattern to be set for the box according to the information. For example, in a case where the user of the role G sets the box input/output information, the selection field 404 is displayed in which only the pattern for the Internet is displayed in a selectable state and the remaining two patterns are displayed in a non-selectable state (see FIG. 19).

Modification Example 1

In the above-described exemplary embodiment, the selection screen 400 of box input/output information is generated based on the attributes of the user. On the other hand, in the modification example, a selection screen 400 is generated which reflects a network from which an instruction of setting operation of the box input/output information for the multifunction peripheral 100 is performed (that is, a network interface from which the input path of the instruction is), in addition to the attributes of the user.

For example, it is conceivable that for the user having the machine administrator authority, the user who performs both the operations on the intranet 300 side and the Internet 350 (LAN 2) side, or the like, the authority setting for enabling selection of "for Intranet" and "for the Internet" exemplified in 13 is made, as the setting control information of the box input/output information corresponding to the attribute of the user. A case is considered where such a user accesses the management information setting section 172 of the multifunction peripheral 100 from a terminal such as a personal computer (PC) or the like through the network to open a box and perform a box input/output information setting operation. In a case where such a user performs a business on the intranet 300 side (or the Internet 350 side), for example, there is a high possibility of opening a box for the business, and in a case where the setting of the existing box is changed, there is a high possibility of making a change according to the business. For example, in a case where such a user performs a setting operation from the intranet 300 side, there is a high possibility of setting box input/output information for the intranet for the target box.

Therefore, in the modification example, the presentation of the option on the selection screen 400 is controlled based on the information on the instruction source network of the setting operation (that is, the network interface through which the instruction passes).

Figure 20:
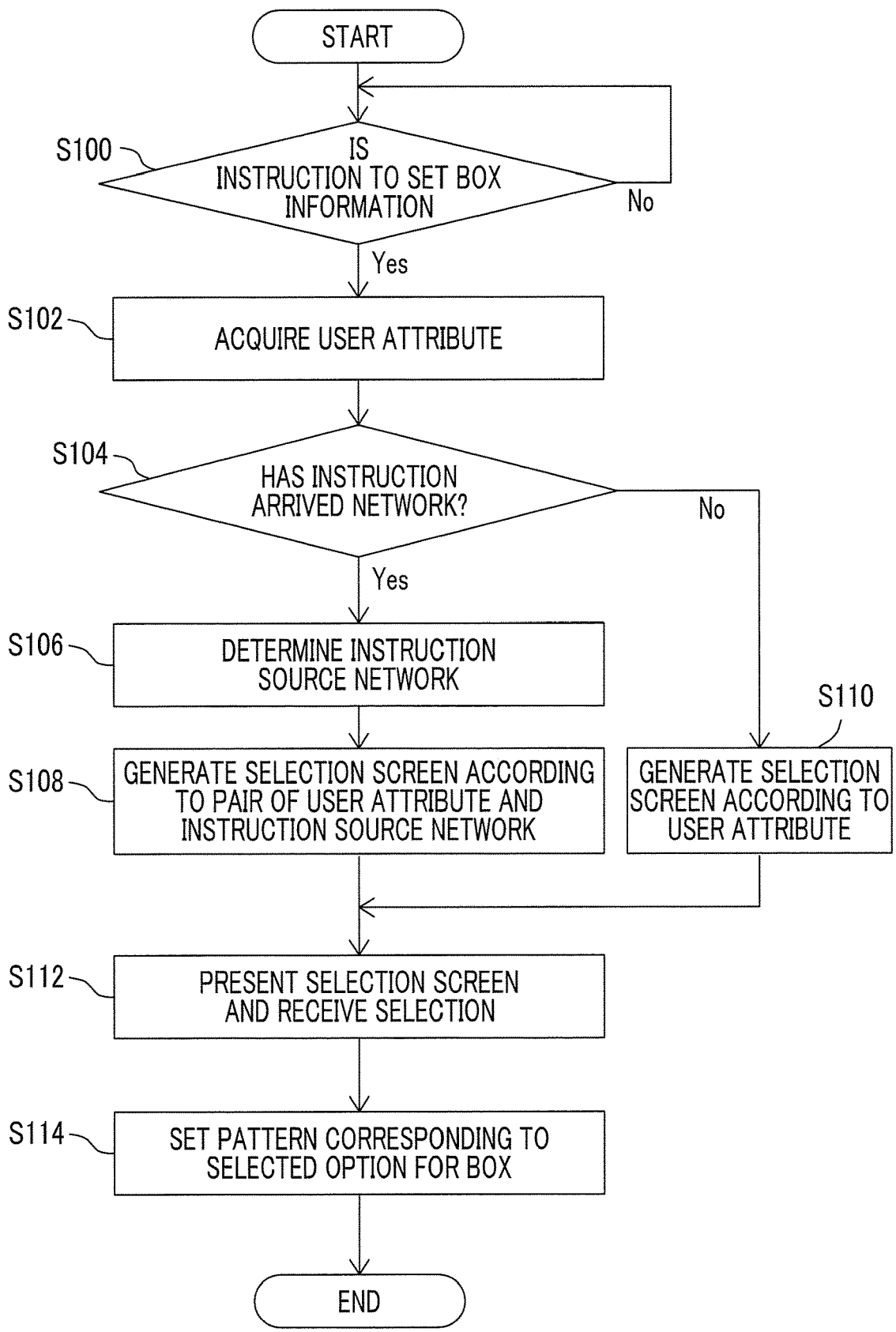
FIG. 20 is a flowchart illustrating a processing procedure of Modification Example 1.

The processing procedure of the management information setting section 172 in the modification example is illustrated in FIG. 20. In this procedure, the management information setting section 172 waits for an instruction to start the setting operation of the box input/output information from the user (S100). Here, the instruction to open a new box includes an instruction to start the setting operation of box input/output information for the box (that is, setting of box input/output information is performed as one of setting items for the opened box), and in a case where the opening instruction comes, the determination result of S100 is Yes.

In a case of receiving an instruction to start the setting operation of the box input/output information, the management information setting section 172 starts the UI process for setting. In this process, first, the management information setting section 172 acquires the attribute of the user through the user attribute acquisition section 170 (S102). The management information setting section 172 determines whether or not an instruction to start the setting operation has arrived through the network (S104). There are cases where the instruction to start the setting operation is issued from the local UI of the multifunction peripheral 100 or from the user's terminal through the network. In the former case, the determination result of S104 is No, and in the latter case, it is Yes.

In a case where the determination result in S104 is No, the management information setting section 172 acquires the setting control information corresponding to the attribute of the user acquired in S102, as in the above-described exemplary embodiment, and displays on the local UI screen, a selection screen 400 (for example, see FIG. 16) including a selection field 404 listing the options indicated by the information.

In a case where the determination result in S104 is YES, the management information setting section 172 determines an instruction source network of the instruction to start the setting operation of the box input/output information (that is, a network interface 120 through which the start instruction has arrived) (S106). A selection screen 400 is generated according to the combination of the attribute of the user and the determination result as to an instruction source network (S108). The process of S108 will be described in detail later.

The management information setting section 172 sends the selection screen 400 generated in S108 or S110 to the local UI screen (in the case of S110) or the instruction source terminal (in the case of S108) for display and receives an input from the user (S112). In a case where the user selects a desired option on the selection screen 400 and performs an operation to decide the selection result, the management information setting section 172 sets the pattern of the box input/output information corresponding to the option selected by the user for the target box (S114).

The process of S108 in the above processing procedure will be described in more detail. In this process, the management information setting section 172 displays the option corresponding to the instruction source network in the selection field 404 (see, for example, FIG. 16 and FIG. 21)

of the box input/output information generated according to the instruction received in S100 in a display mode distinguished from other options.

In one example of the distinction of this display mode, among the options displayed in the selection field 404, options corresponding to the instruction source network are set to a selected state, and options not corresponding to the instruction source network are set to a non-selected state. A specific example will be described with reference to FIG. 21. In this example, a user who can select two options, that is, "for Intranet" and "for the Internet", out of the three options shown in FIG. 13, from the user attributes, accesses the multifunction peripheral 100 from the terminal on the LAN 2 (see FIG. 11) on the Internet 350 side, and performs a setting operation of box input/output information for a certain box 402. In this case, the management information setting section 172 generates a selection screen 400 including the selection field 404 exemplified in FIG. 21, and transmits the selection screen 400 to the instruction source terminal. In the selection field 404, among the three options, two options of "for Intranet" and "for Internet" are displayed with high-density texts indicating that selection is possible, and the option "for Internet Fax reception" is displayed with a low-density text indicating that selection is not possible (that is, in a grayed-out state). Further, in the selection field 404, out of two selectable networks, an option "for the Internet" including a LAN 2 which is an instruction source network in an output-permitted path of a document is set to a selected state. The selected state is a state in which the option is selected by the user. The selected state is provisional and the user can also reselect another option from the first selected option. After the option desired by the user is set to a selected state, the user performs the decision operation with the graphical user interface (GUI) part for deciding the selection such as the "decision" button or the "send" button, not shown, so the selection is decided.

As described above, in the selection field 404A displayed first when the instruction to start the setting operation of the box input/output information is made, among the selectable options associated with the user attribute, an option having the instruction source network (that is, a network k having a terminal that sends a setting operation instruction) as an output-permitted path is set to a selected state. For use of boxes from the network, it is considered that the case of retrieving the document in the box is more than the case of storing the document in the box, so that the output-permitted path is taken into consideration in deciding the option to be a selected state.

However, this is only an example, and another example is also conceivable. For example, an option in which the instruction source network of the setting operation of the box input/output information is set as the input-permitted path or the output-permitted path may be presented as the selected state.

Figure 21:
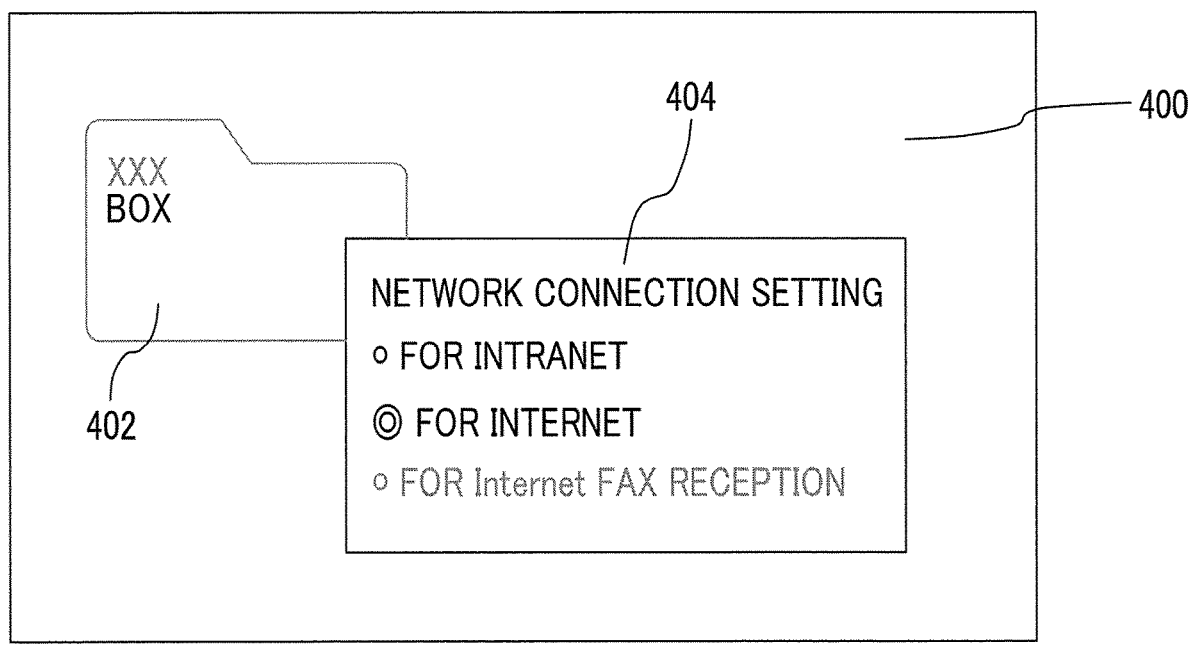
FIG. 21 is a diagram showing an example of a selection screen in Modification Example 1.

The selection field 404A exemplified in FIG. 21 uses an alternative radio button as a GUI for selection. In a case where there are plural options that are selectable options associated with user attributes and are also options to make the instruction source network as the output-permitted path, the management information setting section 172 sets one of the plural options to a selected state in the alternative GUI for selection of the selection field 404A to be initially presented according to the instruction. In another example using a GUI such as a check box in which plural options are selectable, plural corresponding options may be set to a selected state in the selection field to be initially presented.

In another example of the distinction of the display modes of options in S108, the options corresponding to the instruction source network among the options displayed in the selection field 404 are distinguished from the other options in different display modes. The display modes used for distinguishing include, for example, font size, text line width, text color, text density, background color hue, background color density, and the like in a text string indicating an option. The above distinction may be visualized by a combination of two or more of the elements. For example, among the options displayed in the selection field 404, options corresponding to the instruction source network are displayed in bold letters and colored background, and options not corresponding to the instruction source network are displayed with a normal thickness and a normal white background, which make the former stand out relative to the latter. In this example, in a case where there are plural options corresponding to the instruction source network among the options displayed in the selection field 404, the plural options are displayed in a display mode different from the options not corresponding to the instruction source network. For example, the plural options may be displayed in a common display mode that is more conspicuous than the display mode of options not corresponding to the instruction source network. In this case, in a case where the selection field 404 is initially displayed in response to an instruction to start setting from the user, one of the plural options is set to a selected state and may be displayed in a display mode indicating the selected state. In this example, "option corresponding to the instruction source network among options displayed in the selection field 404" may be identical to the above example. That is, for example, "option corresponding to the instruction source network among options displayed in the selection field 404" may be an option including the instruction source network as the output-permitted path, among the selectable options corresponding to the user attributes.

Figure 22:
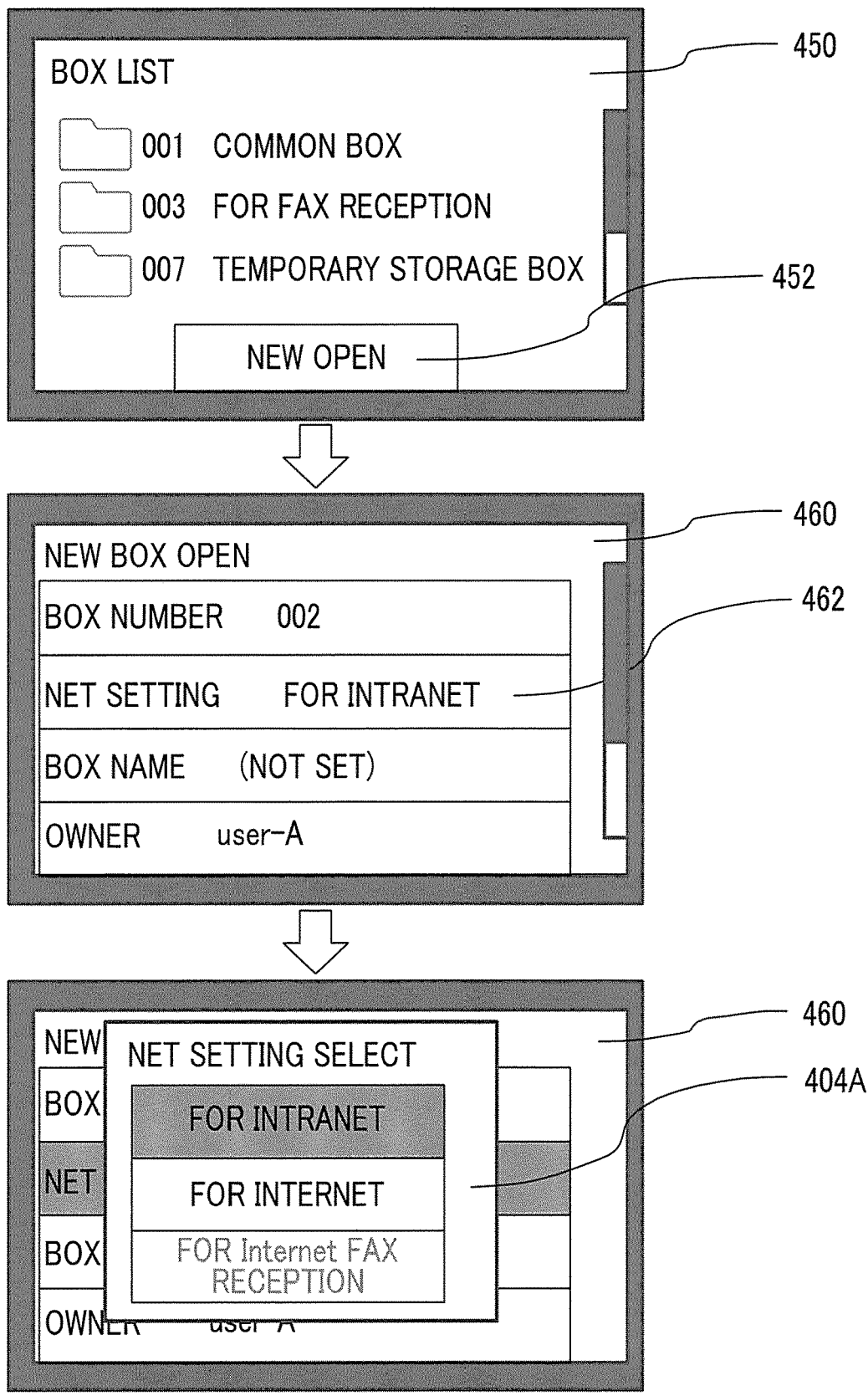
FIG. 22 is a diagram showing an example of transition of a UI screen when opening a box in Modification Example 1.

With reference to FIG. 22, an example of transition of the UI screen when opening a box in the modification example will be described.

In this example, the user accesses the multifunction peripheral 100 from his terminal through the network, and performs an operation on the UI screen sent from the multifunction peripheral 100. Here, it is assumed that the user has selected a box operation from the main menu screen. In this case, the multifunction peripheral 100 provides the box list screen 450 (using, for example, a web technique) to the terminal. On the box list screen 450, a new opening button 452 is displayed together with a list of the boxes currently existing in the multifunction peripheral 100. In a case where the user presses the new opening button 452, the multifunction peripheral 100 provides a new box opening screen 460 to the terminal. On the new box opening screen 460, input fields for items such as a box number, a net setting, a box name, and an owner are shown. The box number is the identification number of the box. One of the unused numbers is provisionally set in the box number field of the new box opening screen 460 which is displayed first in response to a new opening instruction, and this number can be freely changed by the user among unused numbers. In the box name field, the name of the box that the user desires is input. In the owner field, identification information of the user in the multifunction peripheral 100 is displayed (it is assumed that the user has already logged in to the multifunction peripheral 100 and the user identification information is known). In the net setting field, a pattern (option) of the box input/output information set in the box is input. On the new box opening screen 460 which is displayed first in response to a new opening instruction, in the net setting field, an option selected according to a predetermined rule is displayed from among options corresponds to the instruction source network of the instruction of new box opening current time, among the options corresponding to the attributes of the user. In this example, it is assumed that the attribute of the user "user-A" who makes the instruction is associated with two options of "for Intranet" and "for Internet" that can be selected, among the three options illustrated in FIG. 13. Further, it is assumed that the user makes issues the instruction of new box opening current time to the multifunction peripheral 100 from the terminal on the intranet 300 side network (for example, LAN 1). In this case, out of two options of "for Intranet" and "for Internet" corresponding to the user attribute, the option of "for Intranet" corresponding to the instruction source network is set to a selected state and is displayed in the net setting field of the new box opening screen 460. In a case where the user wants to change the option of "for Intranet" which is in a selected state to another option, or in a case where the user wants to know what other options are available, the user selects the net setting field by a clicking operation or the like. Then, the multifunction peripheral 100 provides the selection field 404A to the terminal. In the selection field 404A, the option "for Internet Fax" which cannot be selected according to the attribute of the user is displayed in a gray out state indicating that selection is impossible, and two selectable options "for Intranet" and "for Internet" are displayed in bold letters indicating that they are selectable. In addition, the option "for Intranet" corresponding to the instruction source network of the user is displayed in the selected state, and is distinguished from the option "for the Internet" not corresponding to the instruction source network. It is a matter of course that the user can reselect another option on the selection field 404A.

In the selection field 404 shown in the above example, all of the group of options corresponding to the attribute of the user are displayed while distinguishing between options corresponding to the instruction source network and other options by a display mode. However, this is only an example. As another example, what is displayed in the selection field 404 may be limited to only those corresponding to the option corresponding to the instruction source network, out of the group of options corresponding to the attribute of the user.

Modification Example 2

In Modification Example 1 described above, the instruction source network of the instruction to set the box input/output information through the network is reflected in the display of the group of options on the selection screen 400 of the box input/output information. On the other hand, in Modification Example 2, the user who instructs is allowed to open a new box selects the use purpose of the box to be opened, and the display of the group of options on the selection screen 400 is controlled according to the purpose of use selected by the user.

The main control section 110 of the multifunction peripheral 100 stores one or more options of the box input/output information pattern corresponding to the option, for each option of the use purpose of the box. The use purpose of the box is defined according to the business of the user organization, such as "for confidential documents" and "for general document", for example, and the pattern of selectable box input/output information corresponding to each purpose may be defined according to the purpose. Then, in a case where the user selects the use purpose of the box at the time of opening a new box, the main control section 110 controls the display of the selection field 404 of the box input/output information, according to the combination of the attribute of the user and the selected use purpose. The control of this display may be identical to the case of Modification Example 1 described above. For example, in the display of the selection field 404, in the selection field 404 for displaying a list of options of the box input/output information selectable by the attribute of the user, an option (pattern) corresponding to a use purpose selected by the user is displayed in a display mode for distinguishing from options not corresponding to the use purpose (for example, the former is displayed as a selected state or distinguished by color, text size, character style, or the like). Further, among the options of the box input/output information selectable by the attribute of the user, only the options corresponding to the use purpose may be displayed in a list in the selection field 404.

Figure 23:
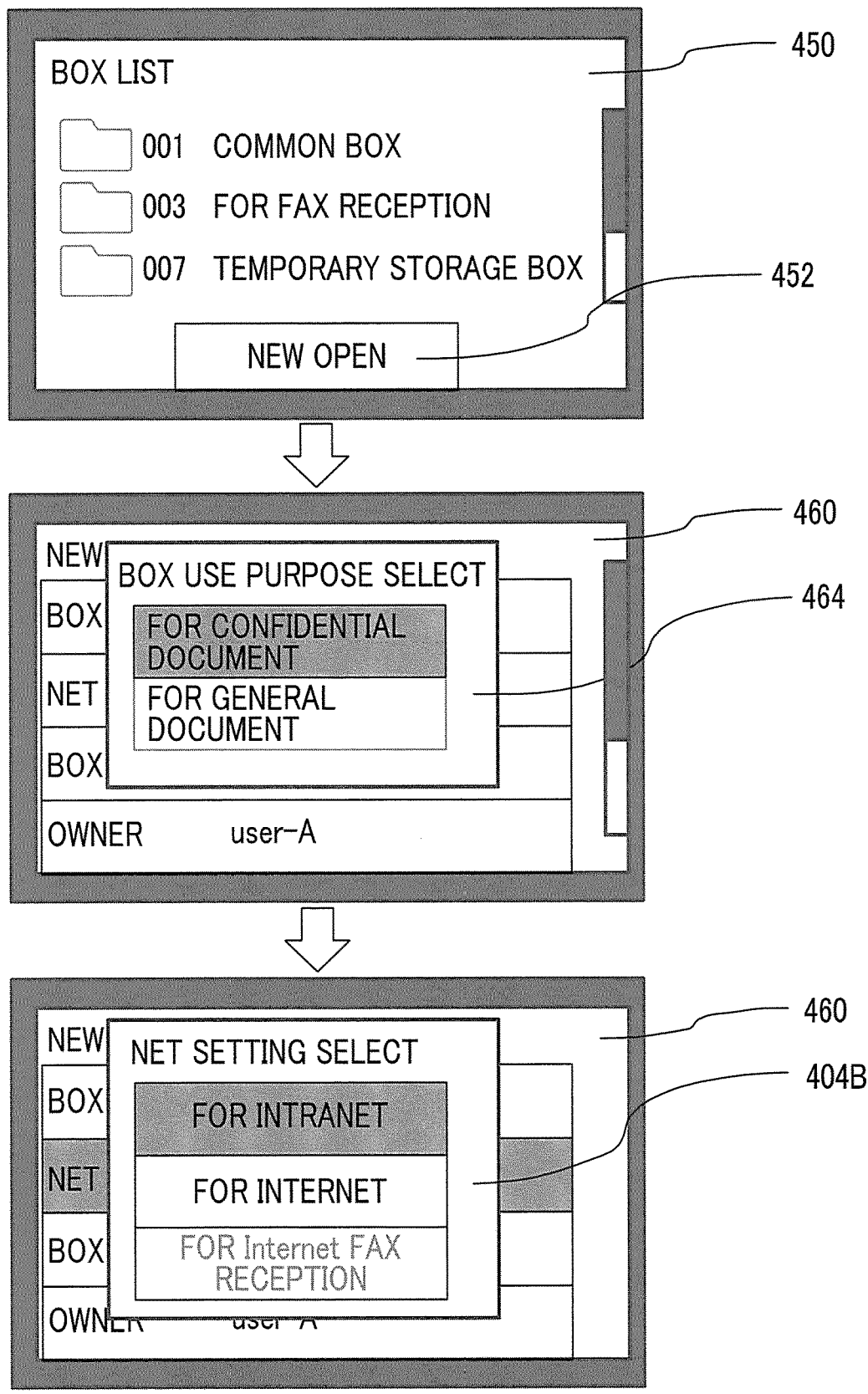
FIG. 23 is a diagram showing an example of transition of the UI screen when opening a box in Modification Example 2.

With reference to FIG. 23, an example of transition of the UI screen when opening a box in Modification Example 2 will be described.

In a case where the user presses the new opening button 452 on the local UI screen of the multifunction peripheral 100 or the box list screen 450 displayed on the remote terminal, the multifunction peripheral 100 displays a box use purpose selection field 464. In the illustrated example, the options of use purpose are "for confidential documents" and "for general documents". Here, it is assumed that as options of box input/output information corresponding to each purpose, for example, "for Intranet" and "for Internet FAX reception" are associated with "for confidential documents", and "for Internet" is associated with "for general documents". Further, it is assumed that the patterns of the box input/output information determined to be selectable by the attribute of the user are "for Intranet" and "for the Internet". In the illustrated example, it is assumed that the user selects "for confidential documents" in the box use purpose selection field 464. In this case, the multifunction peripheral 100 displays the selection field 404B in which "for Intranet" corresponding to the use purpose "for confidential documents" is displayed in a selected state, out of the two patterns "for Intranet" and "for the Internet" corresponding to the attribute of the user.

Modification Example 3

In the exemplary embodiment and the modification examples described above, the user is allowed to select the combination pattern of the input-permitted path and the output-permitted path for the box, but this is only an example. Instead, the user may be allowed to select the input-permitted path and the output-permitted path for the box separately.

In this case, for each attribute of the user, 0 or more input-permitted paths selectable by the attribute and 0 or more output-permitted paths are respectively registered in the management information setting section 172. For example, for an attribute of a machine administrator, it is defined that three network interfaces LAN 1, LAN 2 and Wi-Fi can be selected for both the input-permitted path and the output-permitted path respectively, and for an attribute of a general user, it is defined that LAN 1 and Wi-Fi can be selected for both the input-permitted path and the output-permitted path respectively. For boxes opened by a user with an attribute with 0 option for both the input-permitted path and the output-permitted path, only local input/output of the multifunction peripheral 100 (that is, input by scanning, output by printing, or the like) is permitted.

In a case of receiving an instruction to set box input/output information for a box from the user, the management information setting section 172 presents the group of options of the input-permitted path corresponding to the attribute of the user and the group of options of the output-permitted path to the user. From among these options, the user selects an input-permitted path and an output-permitted path assigned to the box, respectively. The management information setting section 172 sets a pair of the selected input-permitted path and the selected output-permitted path for the box.

Modification Example 4

In the modification example, for each partition (logical drive) of a nonvolatile memory device such as a hard disk or a solid state drive of the multifunction peripheral 100, an input-permitted path and an output-permitted path for the partition are set in the management information setting section 172. With the network environment of FIG. 11 as an example, for example, in the first partition, two network interfaces LAN 1 and Wi-Fi are set in the input-permitted path and the output-permitted path, respectively, and in the second partition, LAN 2 is set in the input-permitted path and the output-permitted path, respectively. The case where the same network interface is set in the input-permitted path and the output-permitted path is merely an example, and it is possible to independently set network interfaces in the input-permitted path and the output-permitted path, respectively.

For each attribute of the user, access right information indicating whether or not the partition can be accessed is set. A user can open a box in a partition accessible by his or her own attribute, but cannot open a box in a partition in which access is disabled. That is, in a case of receiving an instruction to open a new box from the user, the main control section 110 presents to the user a list of partitions that are set to be accessible by the attribute of the user, for example, and receives selection of a partition for newly opening a box from the list.

While the attribute of the user is referred to in a case where the box input/output information is set for the box in the above-described exemplary embodiment, the attribute of the user is referred to in a case where the partition for opening the box is selected in the modification example. Then, the input-permitted path and the output-permitted path set in the partition selected by the user are applied to the box opened there.

Control of document input/output to the box in Modification Example 4 will be described.

First, a case where an instruction to output a document in a box is received from a user will be described. In addition, it should be noted that the user can instruct outputting or inputting of a document only for a box in a partition set to be accessible by the attribute of the user. For boxes in the partition that cannot be accessed by the attribute of the user, neither document output nor input can be instructed.

In a case of receiving an instruction to output the document in the box from the user, the input/output control section 113 performs the process identical to FIG. 6. The process differs from the process of FIG. 6 in that, in the process of FIG. 6, the determination criterion indetermination of S20 is an output-permitted path set in the box, whereas in Modification Example 4, the determination criterion is an output-permitted path set in the partition to which the box belongs. In a case where it is determined in S16 that the output is document transfer through the network, the input/output destination determination section 115 determines the network interface that is the output path to the transfer destination of the document. Then, in S20, the input/output control section 113 determines whether or not the network interface is included in the output-permitted path set for the partition to which the box belongs, and in a case where the network interface is included, the input/output control section 113 transfers the document to the transfer destination in S22.

In a case of receiving an instruction to store the document in the box, the input/output control section 113 performs the process identical to FIG. 7. However, in Modification Example 4, the determination criterion in the determination of S38 is an input-permitted path set in the partition to which the box belongs.

As described above, in Modification Example 4, the input/output control is performed by setting the input-permitted path and the output-permitted path for the partition, and applying the input-permitted path and the output-permitted path to the box opened in the partition.

The method described as Modification Example 4 can be expressed as the following technical idea.

An information processing apparatus including:
plural network interfaces;
plural partitions in a memory device that stores data, each of which is associated with output path information defining a network interface permitted as an output path of the stored data;
a data storage area to be established in response to an instruction of a user, in any one of the plural partitions;
a user attribute storage unit that stores an attribute of each user;
an establishing unit that opens the storage area in one of the plural partitions in response to an instruction from a user, and opens the storage area for a partition set to be accessible according to the attribute of the user.

The exemplary embodiment and modification examples of the present invention are described above. The main control section 110 of the multifunction peripheral 100 exemplified above may be realized, for example, causing a computer built in the multifunction peripheral 100 to execute a program representing the function of each functional module in each apparatus. Here, the computer has as hardware, a circuit configuration in which for example, a processor such as a CPU, a memory (primary storage) such as a random access memory (RAM) and a read only memory (ROM), an HDD controller controlling a hard disk drive (HDD), various input/output (I/O) interfaces, a network interface performing control for connection with a network such as a local area network, and the like are connected through, for example, a bus. In addition, a disk drive for reading from and/or writing to a portable disk recording medium such as a CD or a DVD, a memory reader/writer for reading from and/or writing to portable nonvolatile recording media of various standards such as a flash memory, or the like may be connected to the bus, through for example, I/O interface. A program in which the processing contents of the respective function modules exemplified above are described is stored in a fixed memory device such as a hard disk drive through a recording medium such as a CD or a DVD or through a communication means such as a network, and is installed in a computer. A program stored in a fixed memory device is read into a RAM and executed by a processor such as a CPU to realize the function module group exemplified above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a plurality of network interfaces;
    a storage area for storing data, which is associated with output path information defining a network interface permitted as an output path of the stored data;
    a processor that stores an attribute of each user; and
    wherein the processor receives selection of the output path information associated with the storage area from the user, and receives selection of an option associated with the storage area, from a group of options limited according to the attribute of the user, among a plurality of options for the output path information,
    wherein in a case of receiving an instruction to generate a new storage area from the user, the processor receives selection of the output path information associated with the storage area, and associates the storage area generated in response to the generation instruction with the selected output path information,
    wherein the processor determines a purpose of generating the new storage area relating to the generation instruction,
    wherein the processor controls a presentation mode of the group of options on a selection screen for causing the user to select an option associated with the storage area, according to the purpose.

2. The information processing apparatus according to claim 1,
    wherein in a case of receiving an operation instruction for the selection from the user through a network, the processor controls a presentation mode of the group of options on a selection screen for causing the user to select an option associated with the storage area, according to the network interface which is an input path of the operation instruction.

3. The information processing apparatus according to claim 2,
    wherein the processor presents at least one of options corresponding to the network interface which is the input path of the operation instruction, among the group of the options limited according to the attribute of the user, in a mode distinguishable from the other options, on the selection screen.

4. The information processing apparatus according to claim 2,
    wherein the processor presents a group of options which are limited according to both the attribute of the user and the network interface which is the input path of the operation instruction, among the plurality of options, as a selectable state, on the selection screen.

5. The information processing apparatus according to claim 2,
    wherein in addition to the output path information, input path information defining a network interface permitted as an input path of data to be stored in the storage area is associated with the storage area, and
    wherein the processor further receives selection of the input path information associated with the storage area, among the options limited according to the attribute of the user, among a plurality of options for the input path information.

6. The information processing apparatus according to claim 3,
    wherein the processor presents one option for permitting the network interface which is the input path of the operation instruction, as the output path, among the group of the options limited according to the attribute of the user, as a selected state, on the selection screen.

7. The information processing apparatus according to claim 1,
    wherein in a case of receiving an operation instruction for the selection from the user through a network, the processor controls a presentation mode of the group of options on a selection screen for causing the user to select an option associated with the storage area, according to the network interface which is an input path of the operation instruction.

8. The information processing apparatus according to claim 7,
    wherein the processor presents at least one of options corresponding to the network interface which is the input path of the operation instruction, among the group of the options limited according to the attribute of the user, in a mode distinguishable from the other options, on the selection screen.

9. The information processing apparatus according to claim 7,
    wherein the processor presents a group of options which are limited according to both the attribute of the user and the network interface which is the input path of the operation instruction, among the plurality of options, as a selectable state, on the selection screen.

10. The information processing apparatus according to claim 7,
    wherein in addition to the output path information, input path information defining a network interface permitted as an input path of data to be stored in the storage area is associated with the storage area, and
    wherein the processor further receives selection of the input path information associated with the storage area, among the options limited according to the attribute of the user, among a plurality of options for the input path information.

11. The information processing apparatus according to claim 8,
    wherein the processor presents one option for permitting the network interface which is the input path of the operation instruction, as the output path, among the group of the options limited according to the attribute of the user, as a selected state, on the selection screen.

12. The information processing apparatus according to claim 1,
    wherein the processor presents at least one of options corresponding to the purpose, among the group of the options limited according to the attribute of the user, in a mode distinguishable from the other options, on the selection screen.

13. The information processing apparatus according to claim 12,
  wherein the processor presents one of options corresponding to the purpose, among the group of the options limited according to the attribute of the user, as a selected state, on the selection screen.

14. The information processing apparatus according to claim 1,
  wherein the processor presents a group of options which are limited according to both the attribute of the user and the purpose, among the plurality of options, as a selectable state, on the selection screen.

15. The information processing apparatus according to claim 1,
  wherein in addition to the output path information, input path information defining a network interface permitted as an input path of data to be stored in the storage area is associated with the storage area, and
  wherein the processor further receives selection of the input path information associated with the storage area, among the options limited according to the attribute of the user, among a plurality of options for the input path information.

16. The information processing apparatus according to claim 15,
  wherein the processor receives selection of the user from among the options limited according to the attribute of the user, among a plurality of options for an input output pattern which is a combination of the output path information and the input path information, and associates the input output pattern corresponding to the selected option with the storage area.

17. The information processing apparatus according to claim 1,
  wherein in addition to the output path information, input path information defining a network interface permitted as an input path of data to be stored in the storage area is associated with the storage area, and
  wherein the processor further receives selection of the input path information associated with the storage area, among the options limited according to the attribute of the user, among a plurality of options for the input path information.

18. A non-transitory computer readable medium storing a program causing a computer having a plurality of network interfaces to function as:
  a storage area for storing data, which is associated with output path information defining a network interface permitted as an output path of the stored data;
  a user attribute storage unit that stores an attribute of each user;
  a reception unit that receives selection of the output path information associated with the storage area from the user, and receives selection of an option associated with the storage area, from a group of options limited according to the attribute of the user, among a plurality of options for the output path information, wherein in a case of receiving an instruction to generate a new storage area from the user, the reception unit receives selection of the output path information associated with the storage area, and associates the storage area generated in response to the generation instruction with the selected output path information; and
  a determination unit that determines a purpose of generating the new storage area relating to the generation instruction, wherein the reception unit controls a presentation mode of the group of options on a selection screen for causing the user to select an option associated with the storage area, according to the purpose determined by the determination unit.

* * * * *